United States Patent
Watanabe et al.

(10) Patent No.: US 9,423,513 B2
(45) Date of Patent: Aug. 23, 2016

(54) RADIATION IMAGING APPARATUS AND RADIATION IMAGING SYSTEM

(71) Applicant: CANON KABUSHIKI KAISHA, Tokyo (JP)

(72) Inventors: Minoru Watanabe, Honjo (JP); Keigo Yokoyama, Honjo (JP); Masato Ofuji, Takasaki (JP); Jun Kawanabe, Kumagaya (JP); Kentaro Fujiyoshi, Tokyo (JP); Hiroshi Wayama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/721,122

(22) Filed: May 26, 2015

(65) Prior Publication Data
US 2015/0346361 A1    Dec. 3, 2015

(30) Foreign Application Priority Data
Jun. 2, 2014   (JP) .................................. 2014-114369

(51) Int. Cl.
*G06T 1/20* (2006.01)
*G01T 1/17* (2006.01)
(Continued)

(52) U.S. Cl.
CPC . *G01T 1/17* (2013.01); *G01T 1/161* (2013.01); *G01T 1/20* (2013.01); *G01T 1/247* (2013.01); *H04N 5/32* (2013.01); *H04N 5/359* (2013.01); *H04N 5/3577* (2013.01)

(58) Field of Classification Search
CPC ............ G01T 1/247; G01T 1/20; G01T 1/161
USPC .................................. 250/70.09, 370.14, 369
See application file for complete search history.

(56) References Cited

U.S. PATENT DOCUMENTS

| 7,408,167 B2 | 8/2008 | Kameshima et al. ..... 250/370.09 |
| 7,435,968 B2 | 10/2008 | Watanabe et al. ........ 250/370.14 |

(Continued)

FOREIGN PATENT DOCUMENTS

| JP | 2006-101394 | 4/2006 |
| JP | 2012-015913 | 1/2012 |

(Continued)

OTHER PUBLICATIONS

U.S. Appl. No. 14/696,796, filed Apr. 27, 2015.
(Continued)

*Primary Examiner* — David Porta
*Assistant Examiner* — Meenakshi Sahu
(74) *Attorney, Agent, or Firm* — Fitzpatrick, Cella, Harper & Scinto

(57) ABSTRACT

A radiation imaging apparatus includes pixels arranged to form an array, sensors including conversion elements dispersed in the array to monitor radiation, a processing circuit for processing signals from the sensors, first signal lines for transmitting a signal from at least one of the sensors to the processing circuit, and second signal lines extending in a direction parallel to the first signal lines and not directly connected to the pixels and the conversion elements or connected to at least one of the pixels and at least one of the sensors. The processing circuit determines a value of a signal generated by each sensor based on a difference between a value of a signal appearing on the first signal line and a value of a signal appearing on the second signal line.

14 Claims, 22 Drawing Sheets

(51) Int. Cl.
*G01T 1/161* (2006.01)
*G01T 1/24* (2006.01)
*G01T 1/20* (2006.01)
*H04N 5/32* (2006.01)
*H04N 5/357* (2011.01)
*H04N 5/359* (2011.01)

(56) References Cited

U.S. PATENT DOCUMENTS

| | | | |
|---|---|---|---|
| 8,247,779 B2 | 8/2012 | Kameshima et al. | 250/370.09 |
| 2006/0065845 A1 | 3/2006 | Yamaguchi | 250/370.09 |
| 2010/0294942 A1* | 11/2010 | Mochizuki | G01T 1/2928 250/366 |
| 2012/0001079 A1 | 1/2012 | Okada | 250/366 |
| 2012/0049077 A1 | 3/2012 | Okada | 250/370.08 |
| 2012/0199751 A1 | 8/2012 | Watanabe | 250/370.09 |
| 2013/0342514 A1 | 12/2013 | Yokoyama et al. | 345/204 |
| 2016/0047920 A1* | 2/2016 | Yokoyama | G01N 23/04 378/62 |

FOREIGN PATENT DOCUMENTS

| | | |
|---|---|---|
| JP | 2012-045044 | 3/2012 |
| JP | 2012-052896 | 3/2012 |
| JP | 2012-165312 | 8/2012 |

OTHER PUBLICATIONS

U.S. Appl. No. 14/810,579, filed Jul. 28, 2015.

* cited by examiner

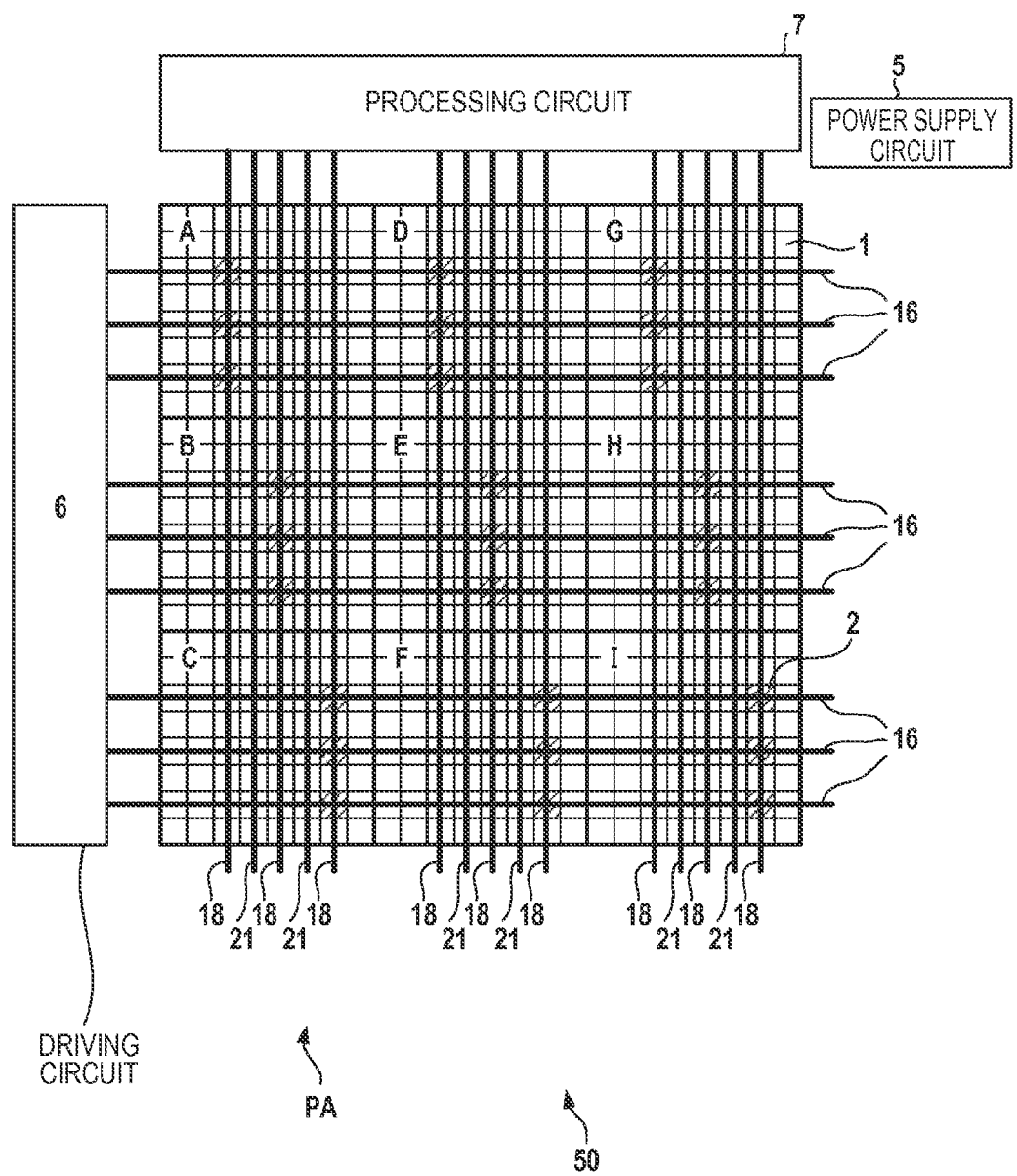

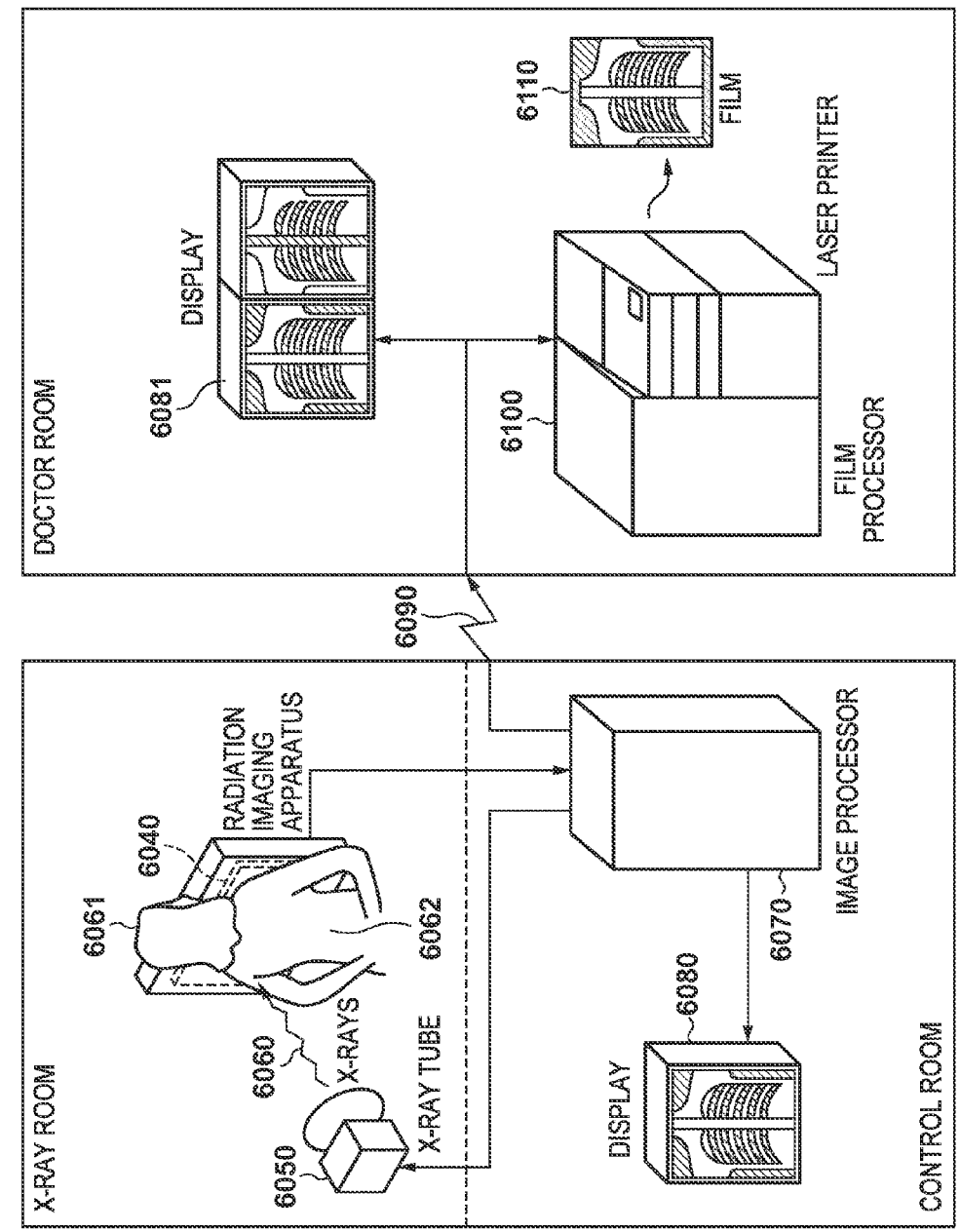

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system.

2. Description of the Related Art

As a radiation imaging apparatus used for medical image diagnosis and nondestructive inspection using radiation such as X-rays, there has been commercially available a radiation imaging apparatus having an array of pixels each obtained by combining a switch such as a TFT (Thin-Film Transistor) and a conversion element such as a photoelectric conversion element.

Recently, studies have been made to develop multifunction radiation imaging apparatuses. One of such studies has been made on the incorporation of a function of monitoring radiation irradiation. This function enables, for example, the detection of the timing of starting radiation irradiation from a radiation source, the detection of the timing when radiation irradiation should be stopped, and the detection of the irradiation dose or integrated irradiation dose of radiation.

Japanese Patent Laid-Open No. 2012-015913 discloses a radiation imaging apparatus having a matrix of a plurality of pixels including pixels for radiation imaging and pixels for radiation detection. The pixels for radiation detection are used to detect the start of radiation irradiation (paragraphs 0074 and 0085), the detection of the end of radiation irradiation (paragraph 0094), or the detection of the cumulative irradiation dose of radiation (paragraph 0094).

In the radiation imaging apparatus disclosed in Japanese Patent Laid-Open No. 2012-015913, the signal lines connected to the pixels for radiation detection extend in the column direction, and non-negligible capacitances exist between the signal lines and the electrodes of photodiodes for radiation imaging. When the radiation imaging apparatus is irradiated with radiation, electric charges generated by photoelectric conversion are accumulated in the photodiodes of the pixels for radiation detection. Signals corresponding to the electric charges are output to the signal lines via TFT switches. On the other hand, when the radiation imaging apparatus is irradiated with radiation, photoelectric conversion also occurs in the photodiodes of the pixels for radiation imaging, and the potentials of the electrodes of the photodiodes change. With these changes, the potentials of the signal lines can change because of the capacitive coupling (crosstalk) between the electrodes and the signal lines via the capacitances. The signals appearing on the signal lines therefore include both signal components from the pixels for radiation detection and components generated by the capacitive coupling with the electrodes of the photodiodes of the pixels for radiation imaging. For this reason, the radiation imaging apparatus disclosed in Japanese Patent Laid-Open No. 2012-015913 cannot accurately detect signals output from the pixels for radiation detection.

Japanese Patent Laid-Open No. 2012-052896 discloses a radiation imaging apparatus including pixels for radiation detection, a plurality of radiation detection lines connected to each other, a plurality of noise detection lines connected to each other, and a radiation detection circuit. The plurality of pixels for radiation detection is dispersed, and each pixel for radiation detection is connected to any of the plurality of radiation detection lines. The radiation detection circuit detects radiation irradiation based on differences between the digital data obtained via the plurality of radiation detection lines connected to each other and the digital data obtained via the plurality of noise detection lines connected to each other.

In the radiation imaging apparatus disclosed in Japanese Patent Laid-Open No. 2012-052896, however, the sum of signals from all the pixels for radiation detection is supplied to the radiation detection circuit via the plurality of radiation detection lines connected to each other. For this reason, the radiation imaging apparatus disclosed in Japanese Patent Laid-Open No. 2012-052896 cannot independently monitor radiation for each set of a plurality of regions or portions.

SUMMARY OF THE INVENTION

The present invention provides a technique advantageous in accurately monitoring radiation independently for each set of a plurality of regions or portions.

One of aspects of the present invention provides a radiation imaging apparatus comprising: a plurality of pixels arranged to form an array having a plurality of rows and a plurality of columns and configured to convert radiation into an electric signal to obtain a radiation image; a plurality of sensors including conversion elements configured to convert radiation into electric signals and dispersed in the array to monitor radiation; a processing circuit configured to process signals output from the plurality of sensors; a plurality of first signal lines configured to transmit a signal output from at least one of the plurality of sensors to the processing circuit; and a plurality of second signal lines extending in a direction parallel to the plurality of first signal lines in the array and not directly connected to the plurality of pixels and the conversion elements or connected to at least one of the plurality of pixels and at least one of the plurality of sensors, wherein the processing circuit determines a value of a signal generated by each sensor based on a difference between a value of a signal appearing on a first signal line, of the plurality of first signal lines, which is for the sensor and a value of a signal appearing on at least one of the plurality of second signal lines.

Further features of the present invention will become apparent from the following description of exemplary embodiments with reference to the attached drawings.

BRIEF DESCRIPTION OF THE DRAWINGS

FIG. 9 is a view showing the arrangement of a radiation imaging apparatus according to the fifth embodiment of the present invention;

FIG. 22 is a view showing an example of the arrangement of a radiation imaging system.

DESCRIPTION OF THE EMBODIMENTS

The present invention will be described through exemplary embodiments with reference to the accompanying drawings.

Figure 1:
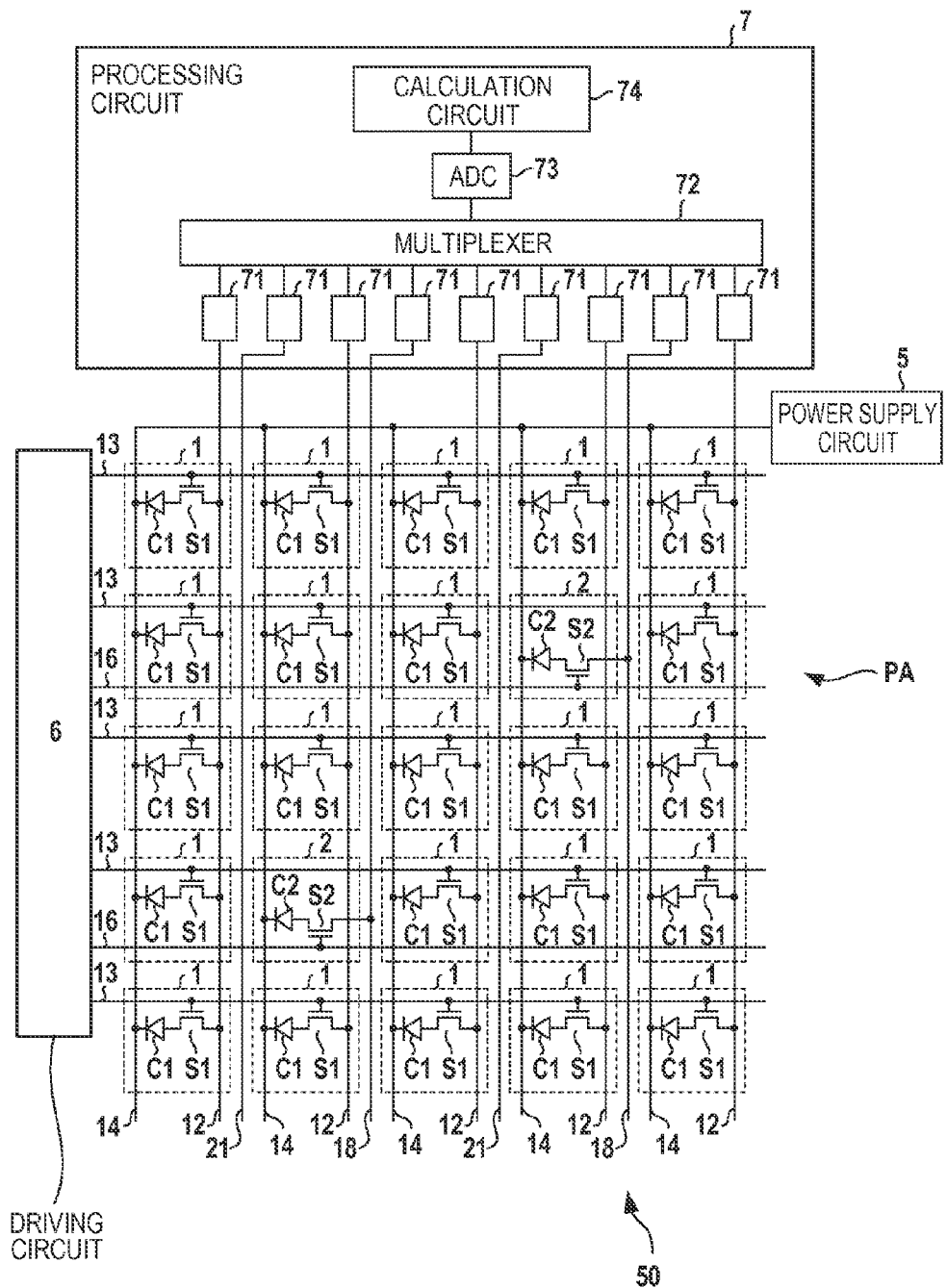
FIG. 1 is a circuit diagram showing the arrangement of a radiation imaging apparatus according to the first embodiment of the present invention.

FIG. 1 is a block diagram showing the arrangement of a radiation imaging apparatus 50 according to the first embodiment of the present invention. The radiation imaging apparatus 50 can include a plurality of pixels 1, a plurality of sensors 2, a processing circuit 7, a driving circuit 6, and a power supply circuit 5.

The plurality of pixels 1 converts radiation into electric signals to obtain a radiation image. The plurality of pixels 1 is arrayed to form an array PA having a plurality of rows and a plurality of columns. Each pixel 1 can include a conversion element C1 which converts radiation into an electric signal and a switch S1 which connects the output electrode of the conversion element C1 to a column signal line 12. The switch S1 can be formed from a TFT (Thin-Film Transistor). A gate line 13 which is driven by the driving circuit 6 is connected to the control electrode (gate electrode) of the switch S1. In this case, one gate line 13 is commonly connected to the pixels on one row. Note that the direction in which the gate line 13 extends is the row direction, and the direction in which the column signal line 12 extends is the column direction. The signal generated by the pixel 1 (more specifically, the signal generated by the conversion element C1) is transmitted to the processing circuit 7 via the switch S1 and the column signal line 12, of the plurality of column signal lines 12, which is for pixel 1.

The plurality of sensors 2 are dispersed in the array PA to monitor radiation. Monitoring radiation makes it possible to detect the start of radiation irradiation, the end of radiation irradiation, and the integrated irradiation dose of radiation. Each sensor 2 can include a conversion element C2 which converts radiation into an electric signal and a switch S2 which connects the conversion element C2 to a detection signal line (first signal line) 18. That is, the conversion element C2 is not directly connected to the detection signal line (first signal line) 18 but is connected to the detection signal line (first signal line) 18 via the switch S2. On the other hand, the plurality of detection signal lines (first signal lines) 18 is connected to the plurality of pixels 1. Each switch S2 can be formed from a TFT (Thin-Film Transistor). A gate line 16 which is driven by the driving circuit 6 is connected to the control electrode (gate electrode) of the switch S2. The signal generated by the switch S2 (more specifically, the signal generated by the conversion element C2) is transmitted to the processing circuit 7 via the switch S2 and the detection signal line 18, of the plurality of detection signal lines 18, which is for the sensor 2. That is, the plurality of first signal lines is a plurality of lines for transmitting the signals output from at least one sensor 2 to the processing circuit 7. The plurality of detection signal lines (first signal lines) 18 extends in a direction parallel to the plurality of columns in the array PA.

The conversion elements C1 and C2 each can be formed from a scintillator which converts radiation into light and a photoelectric conversion element which converts light into an electric signal. The scintillator is generally formed in a sheet-like shape extending over the entire array PA, and can be shared by the plurality of pixels 1 and the plurality of sensors 2. Each photoelectric conversion element can be, for example, a PIN photoelectric conversion element. Alternatively, the conversion elements C1 and C2 each can be formed from a conversion element which directly converts radiation into light. A bias potential is supplied from the bias power supply 5 to each of the conversion elements C1 and C2 via a bias line 14.

A capacitance (parasitic capacitance) exists between each detection signal line (first signal line) 18 and the output electrode of the conversion element C1 of the pixel 1 near the detection signal line 18. The potential of the output electrode of the conversion element C1 of the pixel 1 changes when the conversion element C1 is irradiated with radiation to cause photoelectric conversion in the conversion element C1. For this reason, a signal appearing on the detection signal line 18 includes a signal component from the sensor 2 and a component (crosstalk component) transmitted from the output electrode of the conversion element C1 of the pixel 1 arranged near the detection signal line 18 upon capacitive coupling with the output electrode. The radiation imaging apparatus 50 is therefore provided with a function of reducing or canceling a crosstalk component generated by capacitive coupling.

More specifically, the radiation imaging apparatus 50 includes a plurality of second signal lines 21 extending in a direction parallel to the plurality of columns in the array PA (in other words, a direction parallel to the plurality of detection signal lines (first signal lines) 18). The second signal lines 21 are not directly connected to the conversion elements C2. In addition, the second signal lines 21 are not connected to the plurality of pixels 1. The processing circuit 7 determines the value of the signal generated by each sensor 2 based on the difference between the value of a signal appearing on the detection signal line 18, of the plurality of detection signal lines 18, which is for the sensor 2, and the value of a signal appearing on at least one of the plurality of second signal lines 21. In this case, at least one of the plurality of second signal lines 21 is the second signal line 21 for the sensor 2 (in other words, the second signal line 21 corresponding to the sensor 2). The processing circuit 7 may detect the start and/or end of radiation irradiation based on the sum of signals appearing on the detection signal lines (first signal lines) 18 and the second signal lines 21. This makes it possible to improve the sensitivity of detection of the start and/end of radiation irradiation.

The detection signal lines (first signal lines) 18 and the second signal lines 21 can be arranged such that the capacitance between each detection signal line 18 and the output electrode of the conversion element C1 of the corresponding pixel 1 is almost equal to the capacitance between each second signal line 21 and the output electrode of the conversion element C1 of the corresponding pixel 1.

The calculation of a difference by the processing circuit 7 may be performed by using, for example, analog signals or digital signals. In the case shown in FIG. 1, the processing circuit 7 includes a plurality of detection circuits 71 which respectively detect signals appearing on the plurality of column signal lines 12, the plurality of detection signal lines (first signal lines) 18, and the plurality of second signal lines 21. The processing circuit 7 also includes a multiplexer 72, an AD converter (ADC) 73, and a calculation circuit 74. The multiplexer 72 selects one of the signals detected (sampled) by the plurality of detection circuits 71. The AD converter 73 converts the signal (analog signal) selected by the multiplexer 72 into a digital signal. The calculation circuit 74 processes the signal converted into the digital signal by the AD converter 73. More specifically, the calculation circuit 74 calculates the difference between the signal detected by each detection circuit 71, which detects a signal on the corresponding detection signal line 18, and AD-converted by the AD converter 73 and the signal detected by each detection circuit 71, which detects a signal on the corresponding second signal line 21, and AD-converted by the AD converter 73.

Figure 2:
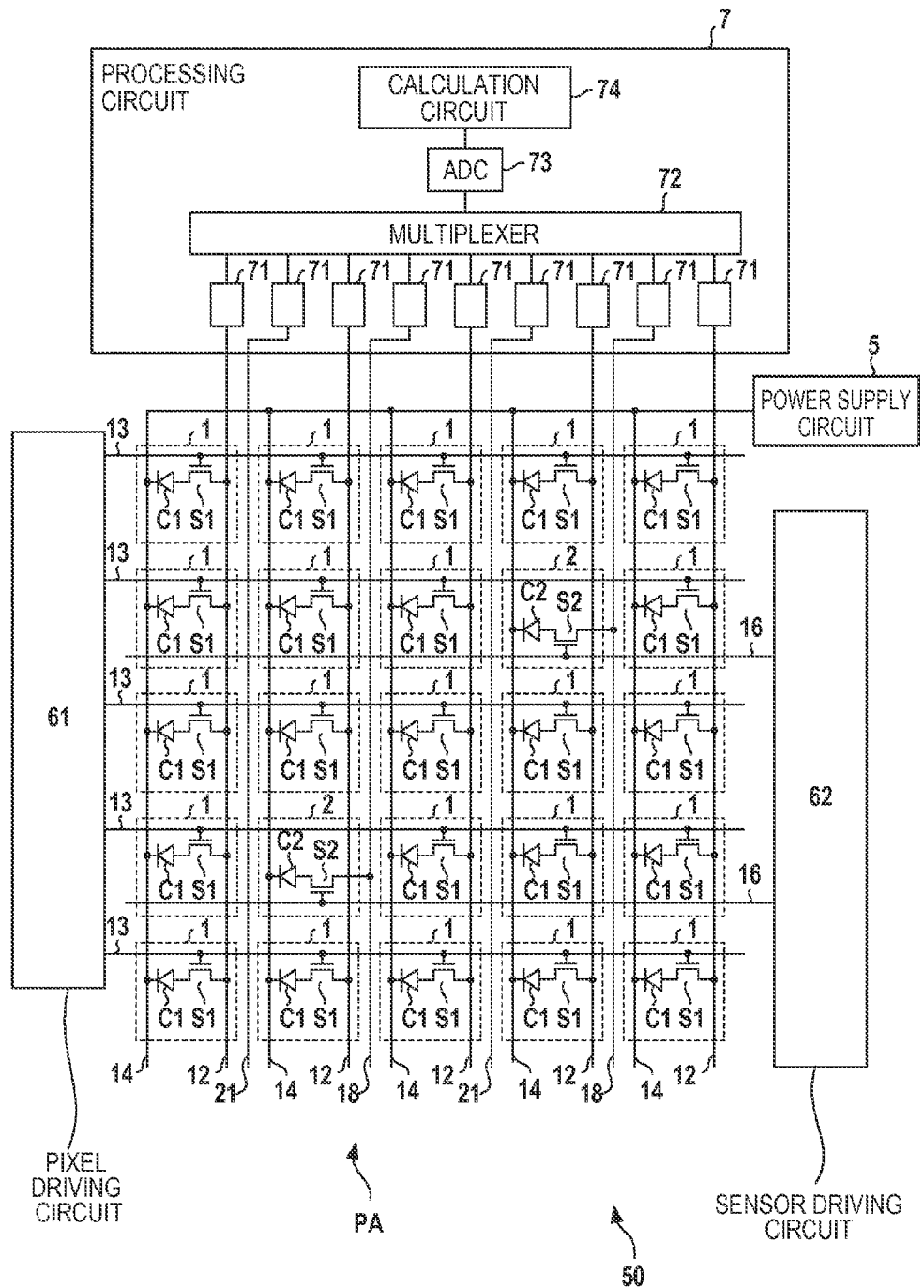
FIG. 2 is a circuit diagram showing the arrangement of a radiation imaging apparatus according to the second embodiment of the present invention.

FIG. 2 shows the arrangement of a radiation imaging apparatus 50 according to the second embodiment of the present invention. According to the second embodiment, a driving circuit 6 is divided into a pixel driving circuit 61 which drives pixels 1 and a sensor driving circuit 62 which drives sensors 2. For example, it is possible to operate the sensor driving circuit 62 during a period from the start of radiation irradiation to the detection of the intensity or integrated irradiation dose of radiation by the sensors 2 and to stop the sensor driving circuit 62 and operate the pixel driving circuit 61 when reading out signals from the pixels 1. A plurality of detection circuits 71 in a processing circuit 7 may also be separately controlled upon being divided into the detection circuits 71 for the pixels 1 and the detection circuits 71 for the sensors 2.

According to the first and second embodiments, the plurality of sensors 2 are dispersed in an array PA constituted by the plurality of pixels 1, and signals can be independently read out from the respective sensors 2. According to the first and second embodiments, therefore, it is possible to independently monitor radiation for each set of a plurality of regions or portions. In addition, it is possible to more accurately monitor radiation by correcting (calculating the difference between two signals) a signal appearing on each detection signal line 18 crossing the array PA by using a signal appearing on a corresponding second signal line 21 crossing the array PA.

Figure 3A:
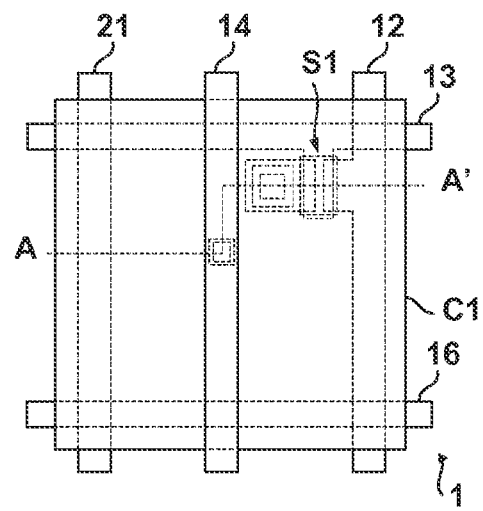
FIG. 3A is a plan view of a pixel, of the pixels of the radiation imaging apparatus shown in FIGS. 1 and 2, which is arranged on the same row as that of a sensor.
Figure 3B:
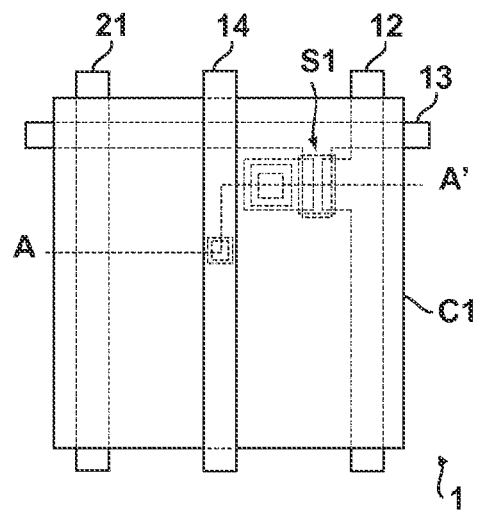
FIG. 3B is a plan view of a pixel, of the pixels of the radiation imaging apparatus shown in FIGS. 1 and 2, which is arranged on a row different from that of a sensor.
Figure 3C:
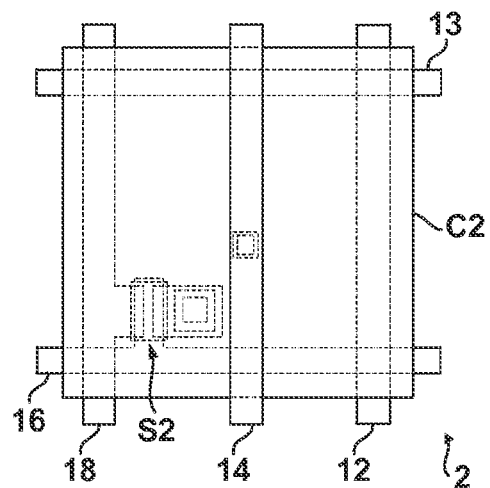
FIG. 3C is a plan view of a sensor of the radiation imaging apparatus shown in FIGS. 1 and 2.

FIG. 3A shows a plan view of the pixel 1, of the pixels 1 of the radiation imaging apparatus 50 shown in FIGS. 1 and 2, which is arranged on the same row as that of the sensor 2. The pixel 1 shown in FIG. 3A includes a gate line 16. FIG. 3B shows a plan view of the pixel 1, of the pixels 1 of the radiation imaging apparatus 50 shown in FIGS. 1 and 2, which is arranged on a row different from that of the sensor 2. The pixel 1 shown in FIG. 3B includes no gate line 16. FIG. 3C shows a plan view of each sensor 2 of the radiation imaging apparatus 50 shown in FIGS. 1 and 2.

Figure 4:
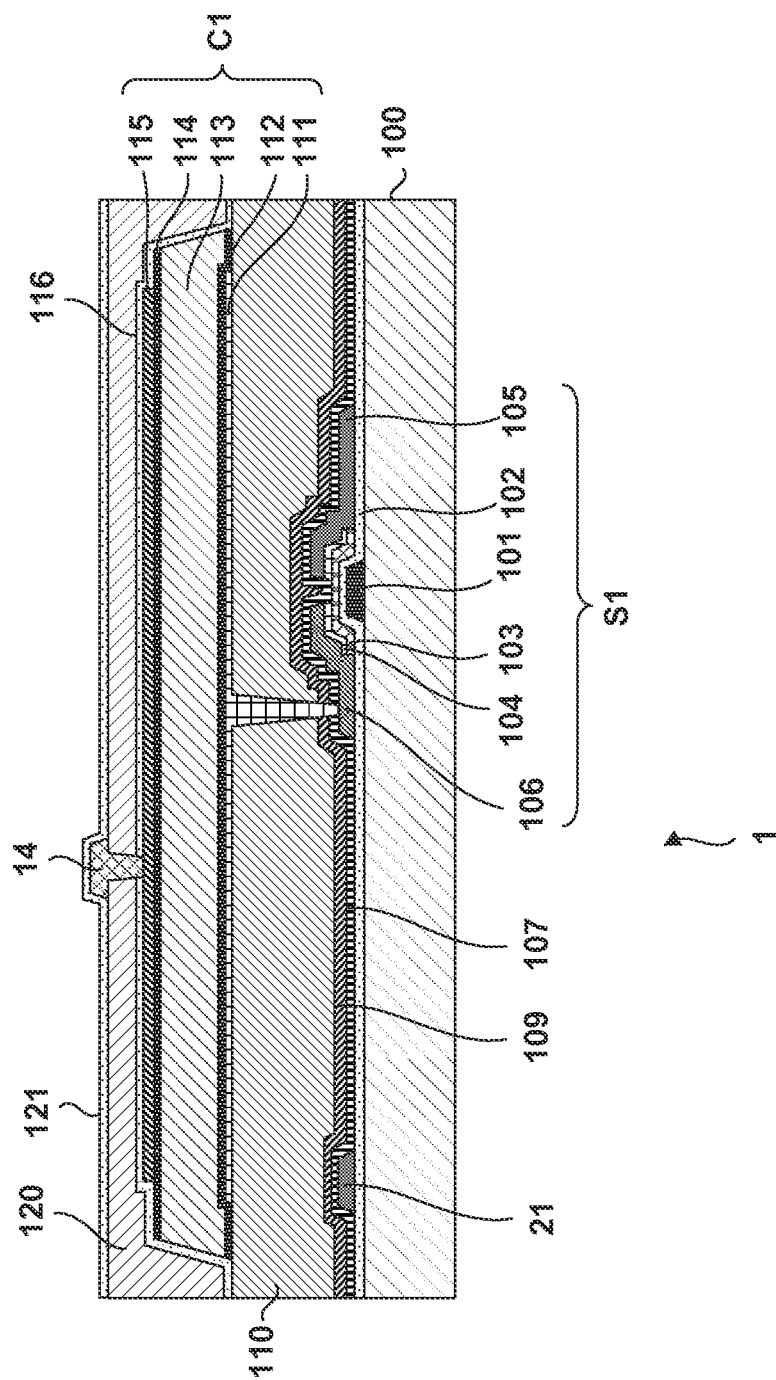
FIG. 4 is a view schematically showing the structure of a section taken along a line A-A' in FIGS. 3A and 3B.

FIG. 4 schematically shows the structure of a section taken along a line A-A' in FIGS. 3A and 3B. A switch (TFT) S1 is arranged on an insulating substrate 100 such as a glass substrate. A first interlayer insulating film 110 is arranged on the switch S1, and a conversion element C1 is arranged on the first interlayer insulating film 110. The switch S1 includes, on the substrate 100 in the order from the substrate 100, a control electrode 101, a first insulating layer 102, a first semiconductor layer 103, a first impurity semiconductor layer 104 higher in impurity concentration than the first semiconductor layer 103, a first main electrode 105, and a second main electrode 106. The first impurity semiconductor layer 104 has regions respectively contacting the first main electrode 105 and the second main electrode 106, and a region of the first semiconductor layer 103 which is located between the respective regions serves as a channel region of the switch S1. The control electrode 101 is connected to the gate line 13. The first main electrode 105 is connected to a column signal line 12. The second main electrode 106 is connected to an output electrode (discrete electrode) 111 of the conversion element C1.

In this case, the first main electrode 105, the second main electrode 106, the column signal line 12, the detection signal line (first signal line) 18, and the second signal line 21 are formed from the same conductive layer, and the first main electrode 105 serves as part of the column signal line 12. A second insulating layer 107, a third insulating layer 109, and the first interlayer insulating film 110 are arranged on the first main electrode 105, the second main electrode 106, and the column signal line 12 in the order from the column signal line 12. The third insulating layer 109 is provided to cover the switch S1, the control electrode 101, and the column signal line 12.

In this case, the switch S1 is formed from an inverted stagger type TFT using a semiconductor layer mainly made of amorphous silicon and an impurity semiconductor layer. However, this is merely an example. The switch S1 can be formed from a stagger type TFT mainly made of polysilicon, organic TFT, or oxide TFT. The first interlayer insulating film 110 is arranged between the substrate 100 and the output electrode (discrete electrode) 111 so as to cover the switch S1, and has a contact hole.

The output electrode 111 of the conversion element C1 is connected to the second main electrode 106 via a contact plug embedded in the contact hole formed in the first interlayer insulating film 110. The conversion element C1 includes, on the first interlayer insulating film 110 in the order from the first interlayer insulating film 110, the output electrode (discrete electrode) 111, a second impurity semiconductor layer 112, a second semiconductor layer 113, a third impurity semiconductor layer 114, and a common electrode 115. A fourth insulating layer 116 is arranged on the common electrode 115 of the conversion element C1. The common electrode 115 of the conversion element C1 is connected to the bias line 14 arranged on a second interlayer insulation film 120. A fifth insulating layer 121 as a protective film is arranged on the bias line 14.

In this case, the detection signal line (first signal line) 18 and the output electrode (discrete electrode) 111 of the conversion element C1 of the pixel 1 can be arranged to overlap each other on a plan view. In addition, the second signal line 21 and the output electrode (discrete electrode) 111 of the conversion element C1 of the pixel 1 can be arranged to overlap each other on a plan view. In another case, the detection signal line (first signal line) 18 and the output electrode (discrete electrode) 111 of the conversion element C1 of the pixel 1 can be arranged so as not to overlap each other on a plan view. In addition, the second signal line 21 and the output electrode (discrete electrode) 111 of the conversion element C1 of the pixel 1 can be arranged so as not to overlap each other on a plan view.

In any case, a parasitic capacitance is formed between the detection signal line (first signal line) 18 and the output electrode (discrete electrode) 111 of the conversion element C1 of the pixel 1. Therefore, the second signal line 21 is arranged to form a parasitic capacitance between the second signal line 21 and the output electrode (discrete electrode) 111 of the conversion element C1 of the pixel 1. As described above, the parasitic capacitance between the detection signal line (first signal line) 18 and the output electrode 111 of the conversion element C1 is preferably almost equal to that between the second signal line 21 and the output electrode 111 of the conversion element C1 of the pixel 1.

Each pair of the detection signal line (first signal line) 18 and the second signal line 21, which provide signals for the calculation of a difference, can be arranged so as to receive almost the same influence of the potential variation of the output electrode 111 of the conversion element C1 of the pixel 1 via capacitive coupling. Each pair of the detection signal line (first signal line) 18 and the second signal line 21 is preferably arranged such that they are located adjacent to each other. For example, each pair of the detection signal line (first signal line) 18 and the second signal line 21 can be arranged such that they are located adjacent to the same pixel or the pixel to which the detection signal line 18 is adjacent is adjacent to the pixel to which the second signal line 21 is adjacent. In this case, depending on a region of a human body to be imaged, each pair of the detection signal line (first signal line) 18 and the second signal line 21 may be arranged such that they are spaced apart from each other by about several mm.

Figure 5:
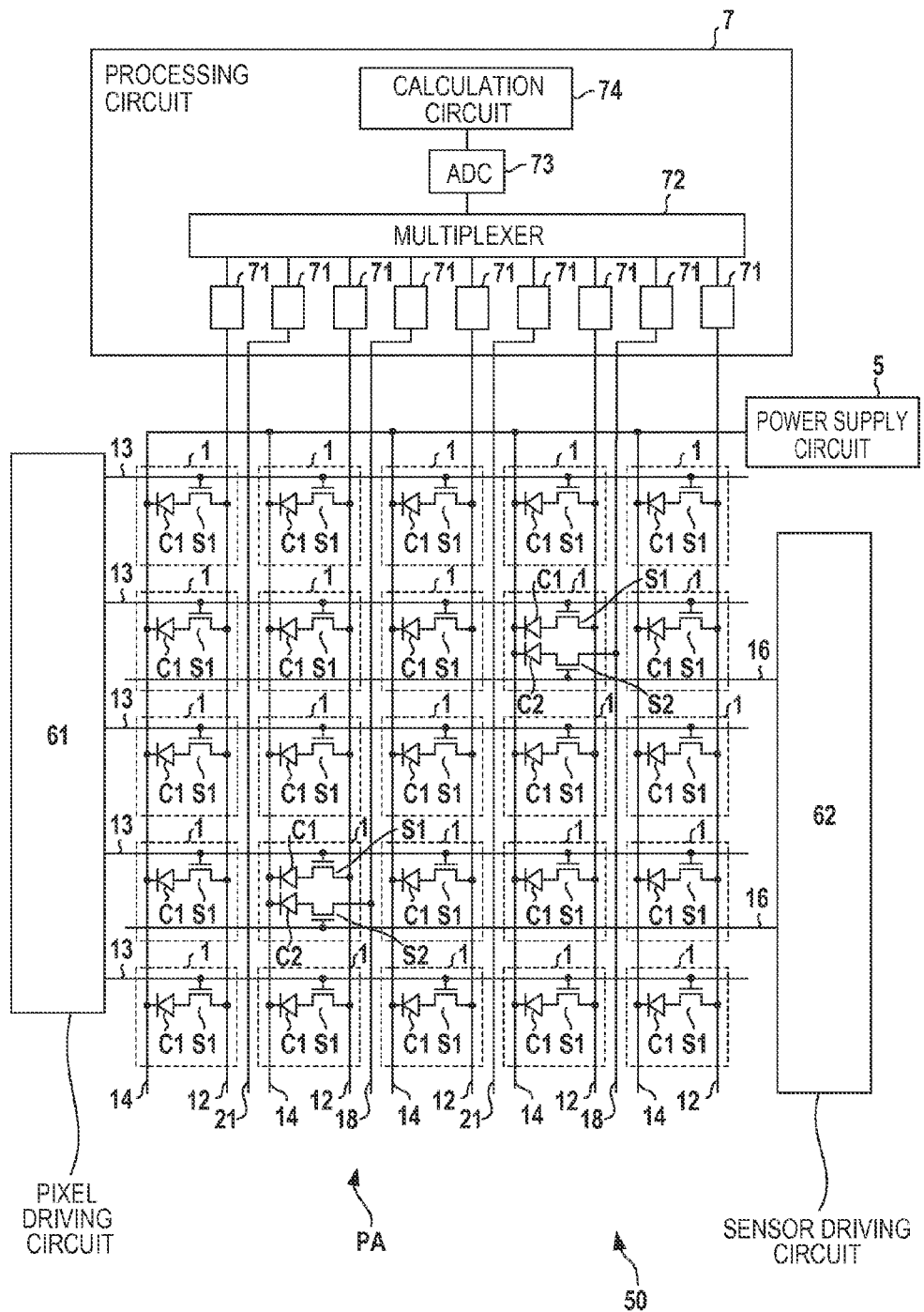
FIG. 5 is a circuit diagram showing the arrangement of a radiation imaging apparatus according to the third embodiment of the present invention.
Figure 6:
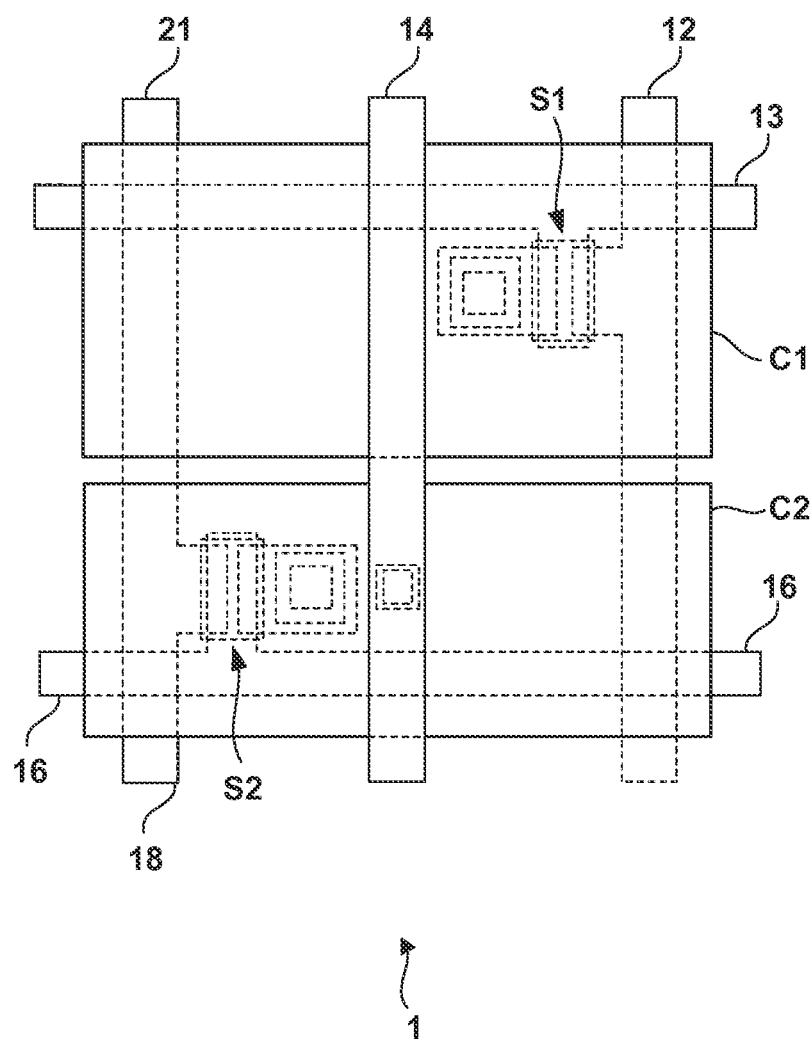
FIG. 6 is a view showing the arrangement of a pixel at a position where a sensor of the radiation imaging apparatus according to the third embodiment of the present invention is arranged.

FIG. 5 shows the arrangement of a radiation imaging apparatus 50 according to the third embodiment of the present invention. Note that details which are not mentioned in the third embodiment can comply with the first and second embodiments. In the third embodiment, a plurality of pixels 1 forming an array PA having a plurality of rows and a plurality of columns are arranged such that all the plurality of rows are formed by the same number of pixels 1. In other words, in the third embodiment, the pixels 1 are also arranged at the positions (the positions specified by rows and columns) where the sensors 2 are arranged in the first and second embodiments. The pixel 1 at such a position can be regarded as a pixel incorporating the sensor 2 (C2, S2). FIG. 6 exemplifies the arrangement of the pixel 1 at the position where the sensor 2 is arranged.

In the third embodiment, a conversion element C1 of the pixel 1 arranged at the position where the sensor 2 (C2, S2) is arranged can be smaller in area than the conversion element C1 of the pixel 1 arranged at another position. However, a difference in sensitivity due to such a difference in area can be corrected by a method similar to shading correction, for example, gain correction and/or offset correction.

Figure 7:
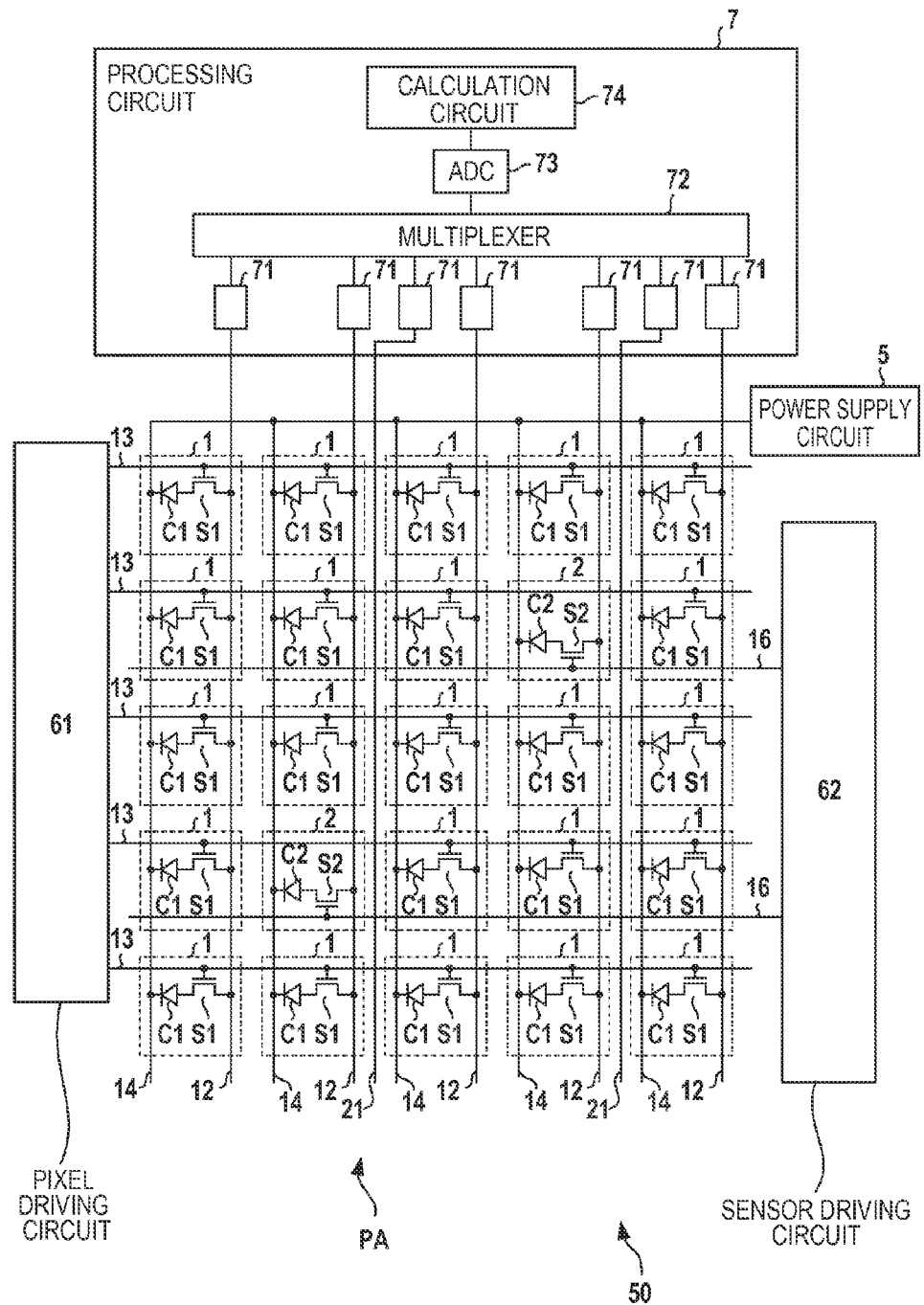
FIG. 7 is a circuit diagram showing the arrangement of a radiation imaging apparatus according to the fourth embodiment of the present invention.

FIG. 7 shows the arrangement of a radiation imaging apparatus 50 according to the fourth embodiment of the present invention. Details which are not mentioned in the fourth embodiment can comply with the first to third embodiments. In the fourth embodiment, each sensor 2 is connected to a column signal line 12. In addition, each second signal line 21 can be arranged to be paired with each column signal line 12 to which the sensor 2 is connected. In the fourth embodiment, the column signal lines 12 function as the first signal lines for transmitting the signals generated by the sensors 2 to a processing circuit 7, and transmit signals from pixels 1 to the processing circuit 7.

Figure 8A:
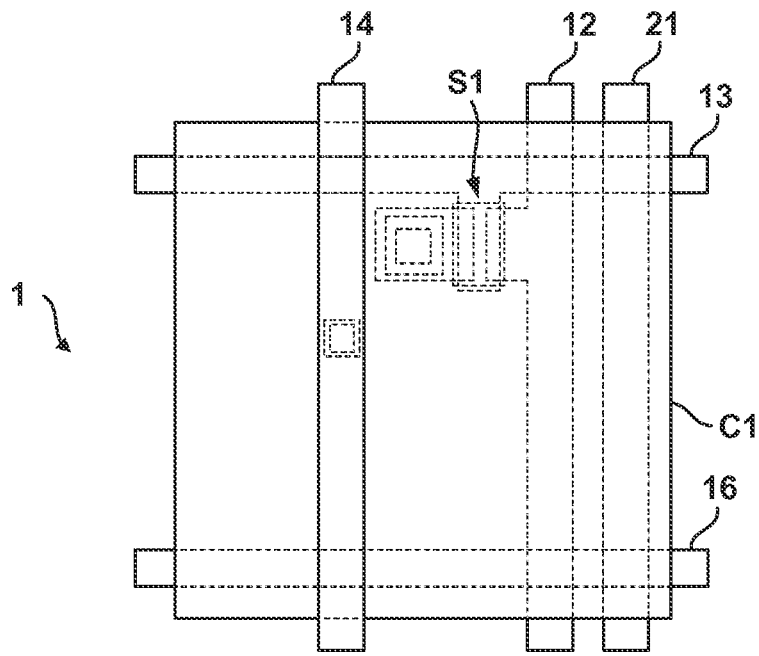
FIGS. 8A and 8B are a plan view (a) of a pixel and a plan view (b) of a sensor according to the fourth embodiment of the present invention.
Figure 8B:
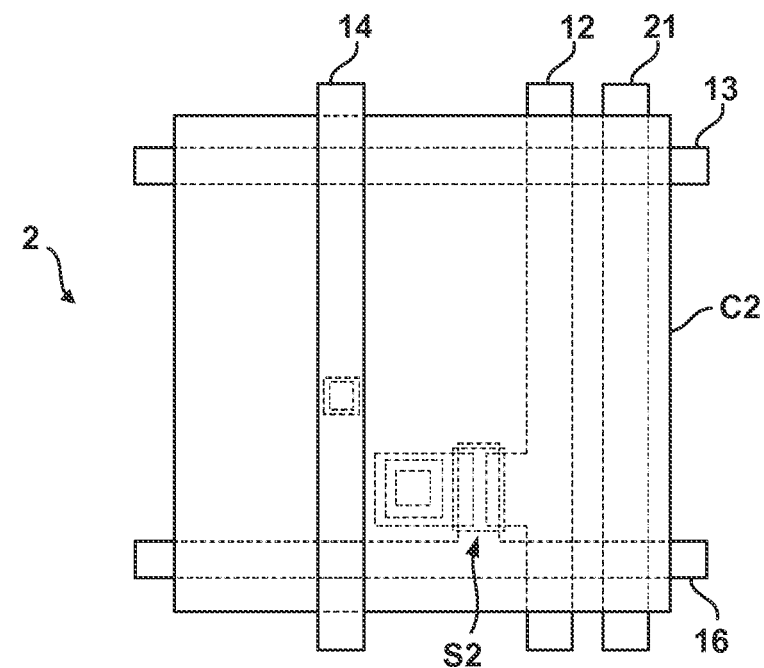

FIG. 8A shows a plan view of each pixel 1 according to the fourth embodiment. FIG. 8B shows a plan view of each sensor 2 according to the fourth embodiment. Each column signal line (first signal line) 12 and each second signal line 21, which form a pair, have almost the same shape and extend parallel to the column.

FIG. 9 shows the arrangement of a radiation imaging apparatus 50 according to the fifth embodiment of the present invention. Details which are not mentioned in the fifth embodiment can comply with the first to fourth embodiments. For clarity, FIG. 9 omits gate lines 13 which drive pixels 1 and column signal lines 12 for transmitting signals from the pixels 1 to a processing circuit 7. In an array PA, the hatched boxes indicate sensors 2, and the white boxes indicate the pixels 1. The array PA has a plurality of regions A to I. A plurality of sensors 2 are arranged in each region. In the case shown in FIG. 9, each region is provided with the three sensors 2 arrayed along the column direction. The sensors 2 are connected to detection signal lines (first signal lines) 18. Second signal lines 21 are arranged to be paired with the detection signal lines 18.

Figure 10:
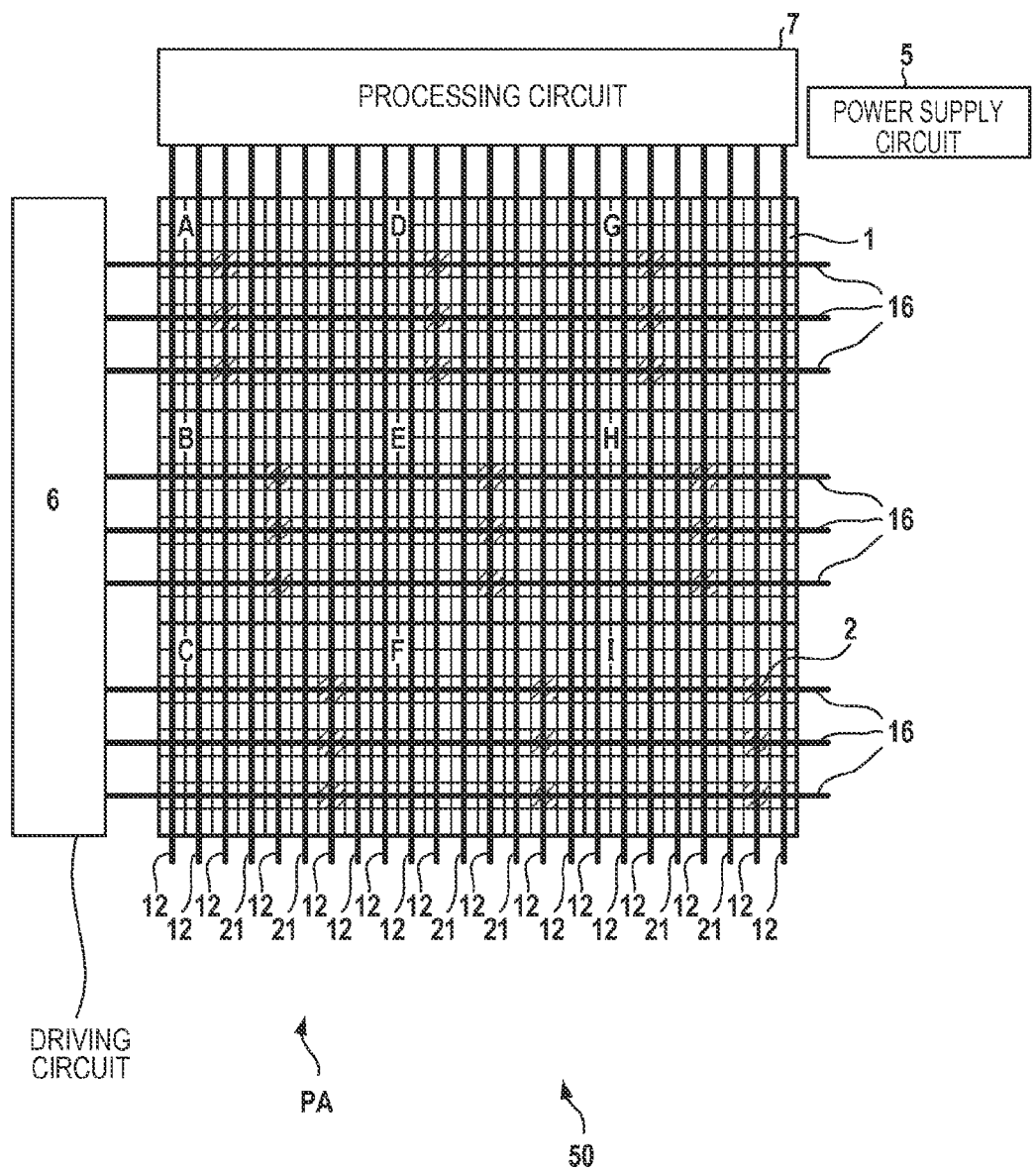
FIG. 10 is a view showing the arrangement of a radiation imaging apparatus according to the sixth embodiment of the present invention.

FIG. 10 shows the arrangement of a radiation imaging apparatus 50 according to the sixth embodiment of the present invention. Details which are not mentioned in the sixth embodiment can comply with the first to fifth embodiments. For clarity, FIG. 10 omits gate lines 13 which drive pixels 1. In the sixth embodiment, sensors 2 are connected to column signal lines 12. That is, in the sixth embodiment, the column signal lines 12 function as the first signal lines for transmitting the signals generated by the sensors 2 to a processing circuit 7, and transmit signals from pixels 1 to the processing circuit 7.

Figure 11:
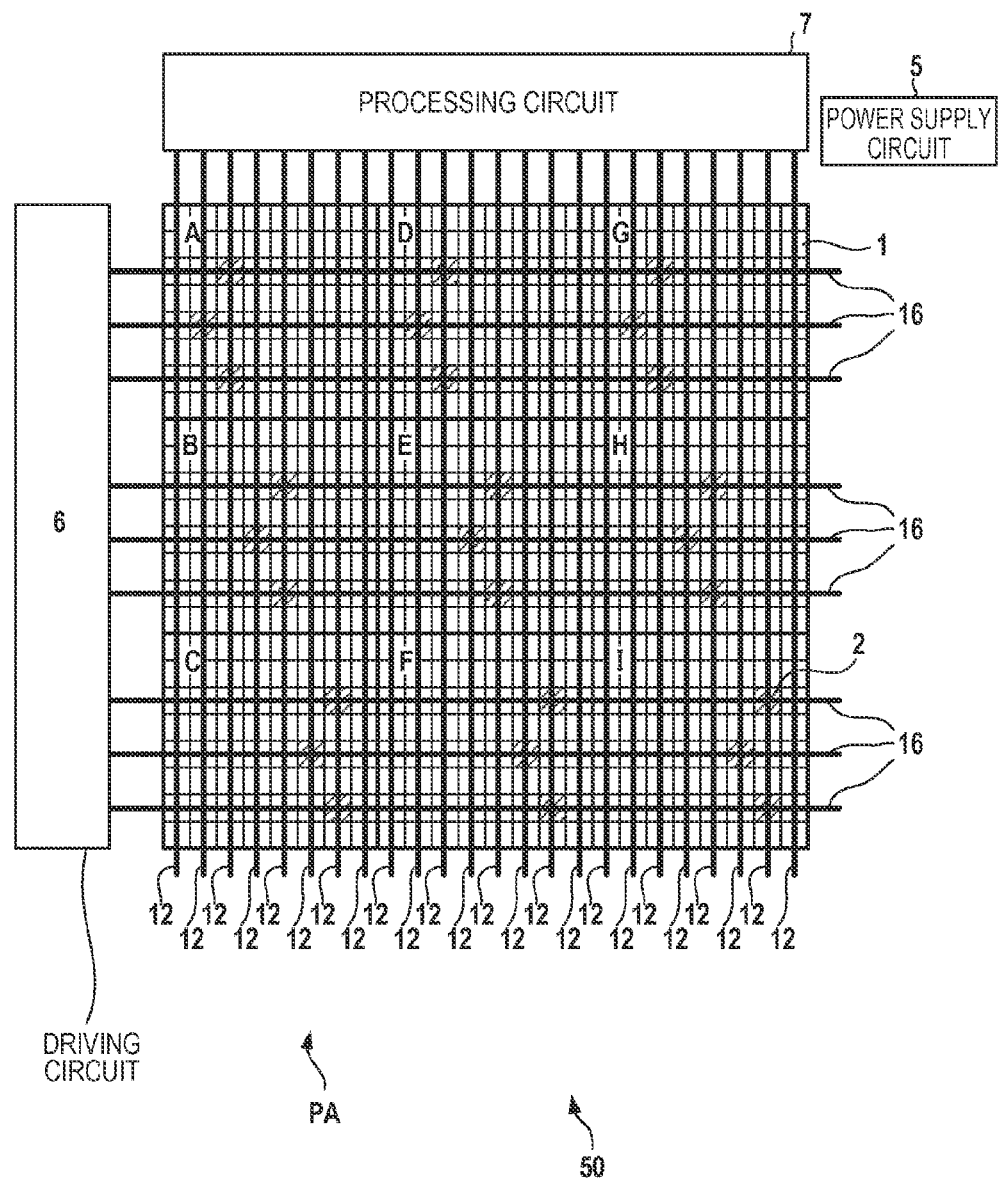
FIG. 11 is a view showing the arrangement of a radiation imaging apparatus according to the seventh embodiment of the present invention.

FIG. 11 shows the arrangement of a radiation imaging apparatus 50 according to the seventh embodiment of the present invention. Details which are not mentioned in the seventh embodiment can comply with the first to sixth embodiments. For clarity, FIG. 11 omits gate lines 13 which drive pixels 1. According to the seventh embodiment, at least one sensor 2 is connected to a column signal line 12 connected to at least one pixel 1. In addition, in the seventh embodiment, one column signal line 12 functions as the first signal line for transmitting the signals generated by the sensors 2 to a processing circuit 7, and transmits signals from pixels 1 to the processing circuit 7. Other column signal lines 12 function as the second signal lines for transmitting the signals generated by other sensors 2 to the processing circuit 7, and transmit signals from the pixels 1 to the processing circuit 7.

In addition, according to the seventh embodiment, in each of regions A to I, the number (first count) of sensors 2 connected to the one column signal line (first signal line) 12 differs from the number (second count) of sensors 2 connected to the other column signal line (second signal line) 12.

Each sensor 2 connected to the one column signal line (first signal line) 12 differs from each sensor 2 connected to the other column signal line (second signal line) 12. The processing circuit 7 monitors radiation based on the difference between the value of a signal appearing on the first signal line and the value of a signal appearing on the second signal line. The processing circuit 7 may detect the start and/or end of radiation irradiation based on the sum of a signal appearing on the first signal line and a signal appearing on the second signal line.

Figure 12:
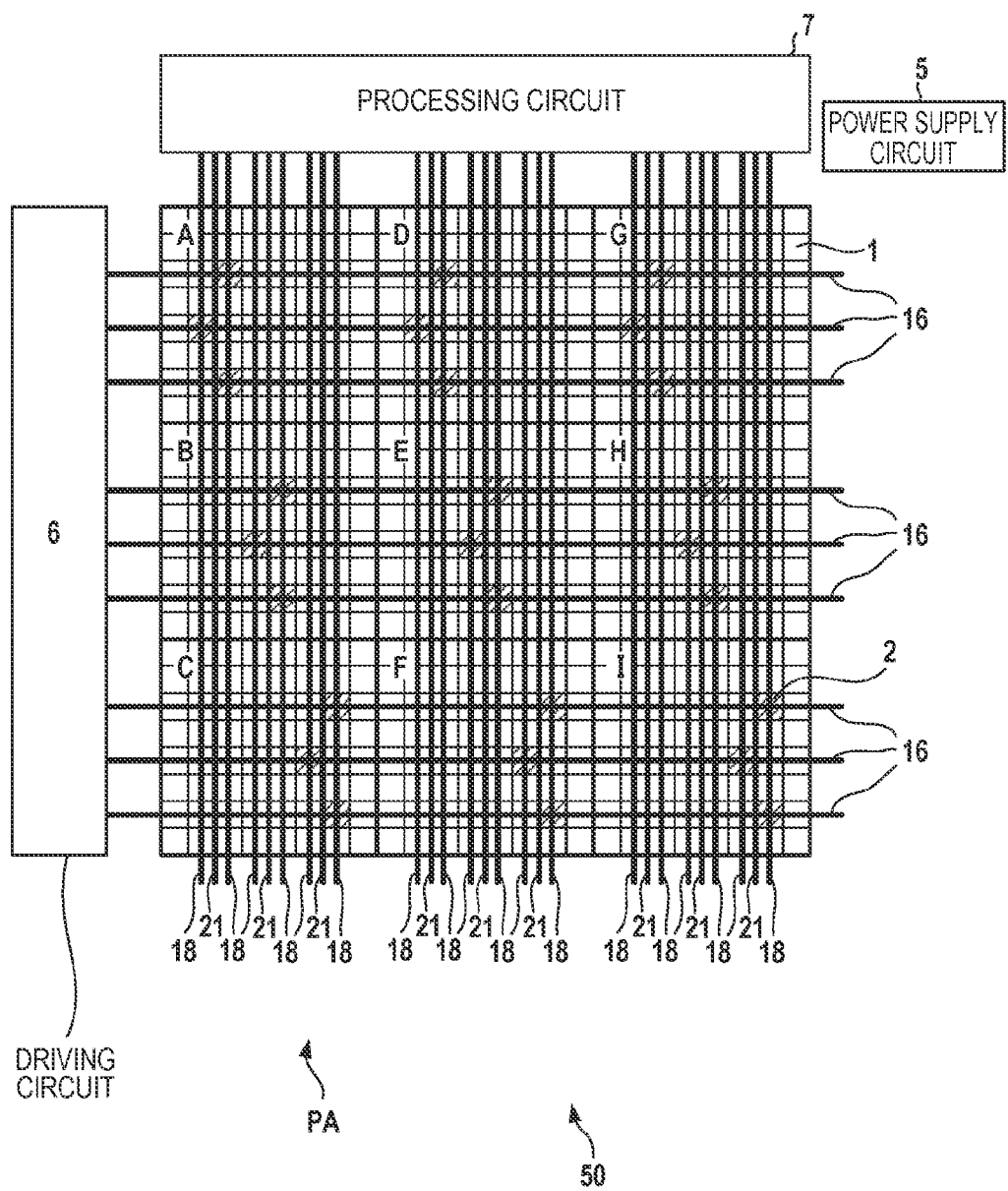
FIG. 12 is a view showing the arrangement of a radiation imaging apparatus according to the eighth embodiment of the present invention.

FIG. 12 shows the arrangement of a radiation imaging apparatus 50 according to the eighth embodiment of the present invention. Details which are not mentioned in the eighth embodiment can comply with the first to seventh embodiments. For clarity, FIG. 12 omits gate lines 13 which drive pixels 1 and column signal lines 12 for transmitting signals from the pixels 1 to a processing circuit 7. According to the eighth embodiment, signals from sensors 2 are transmitted to the processing circuit 7 via detection signal lines (first signal lines) 18.

Figure 13:
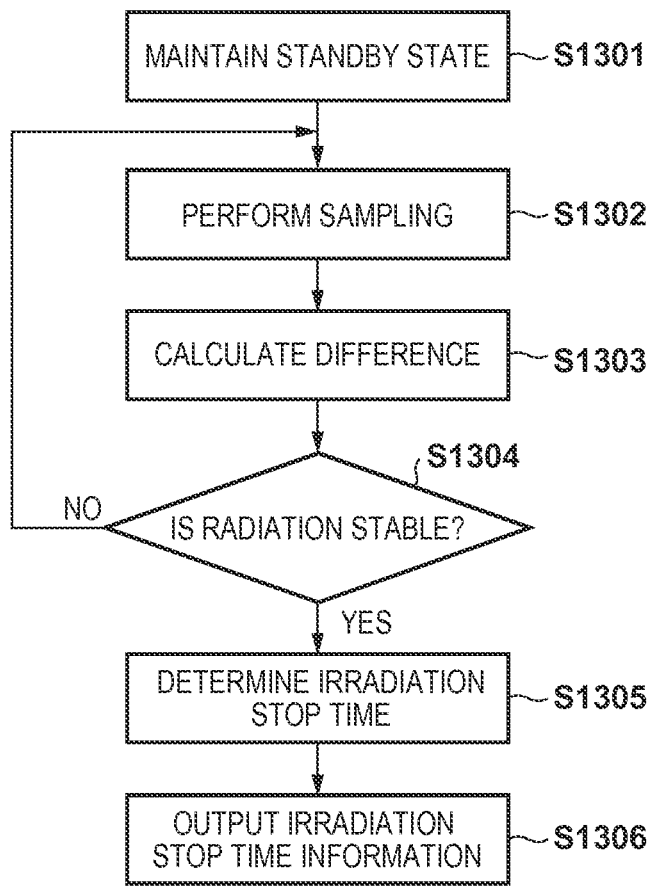
FIG. 13 is a flowchart showing the ninth embodiment of the present invention.

FIG. 13 shows an operation as the ninth embodiment of the present invention, which can be applied to the radiation imaging apparatuses 50 according to the first to eighth embodiments or radiation imaging apparatuses 50 to be described in the subsequent embodiments. In step S1301, the radiation imaging apparatus 50 maintains a standby state. When the start of radiation irradiation is detected, the process advances to step S1302. In this case, for example, the start of radiation irradiation may be detected based on a signal from a controller which controls the radiation source or may be detected by the processing circuit 7 based on a signal from each sensor 2.

In step S1302, a processing circuit 7 causes a detection circuit 71 to sample a signal from each sensor 2 which is transmitted through the first signal line and a signal appearing on the second signal line. In step S1302, the processing circuit 7 calculates the difference between the sampled signal from the sensor 2 which is transmitted through the first signal line and the sampled signal appearing on the second signal line.

In step S1304, the processing circuit 7 determines, based on the difference, whether the irradiation dose of radiation has become stable. If the processing circuit 7 determines that the irradiation dose has not become stable, the process returns to step S1302. If the processing circuit 7 determines that the irradiation dose has become stable, the process advances to step S1305.

In step S1305, the processing circuit 7 determines the time (irradiation stop time) when radiation irradiation should be stopped, based on the difference. In step S1305, the processing circuit 7 transmits the irradiation stop time information to a controller which controls the radiation source. The controller controls the stop of radiation irradiation based on the irradiation stop time information.

Figure 14:
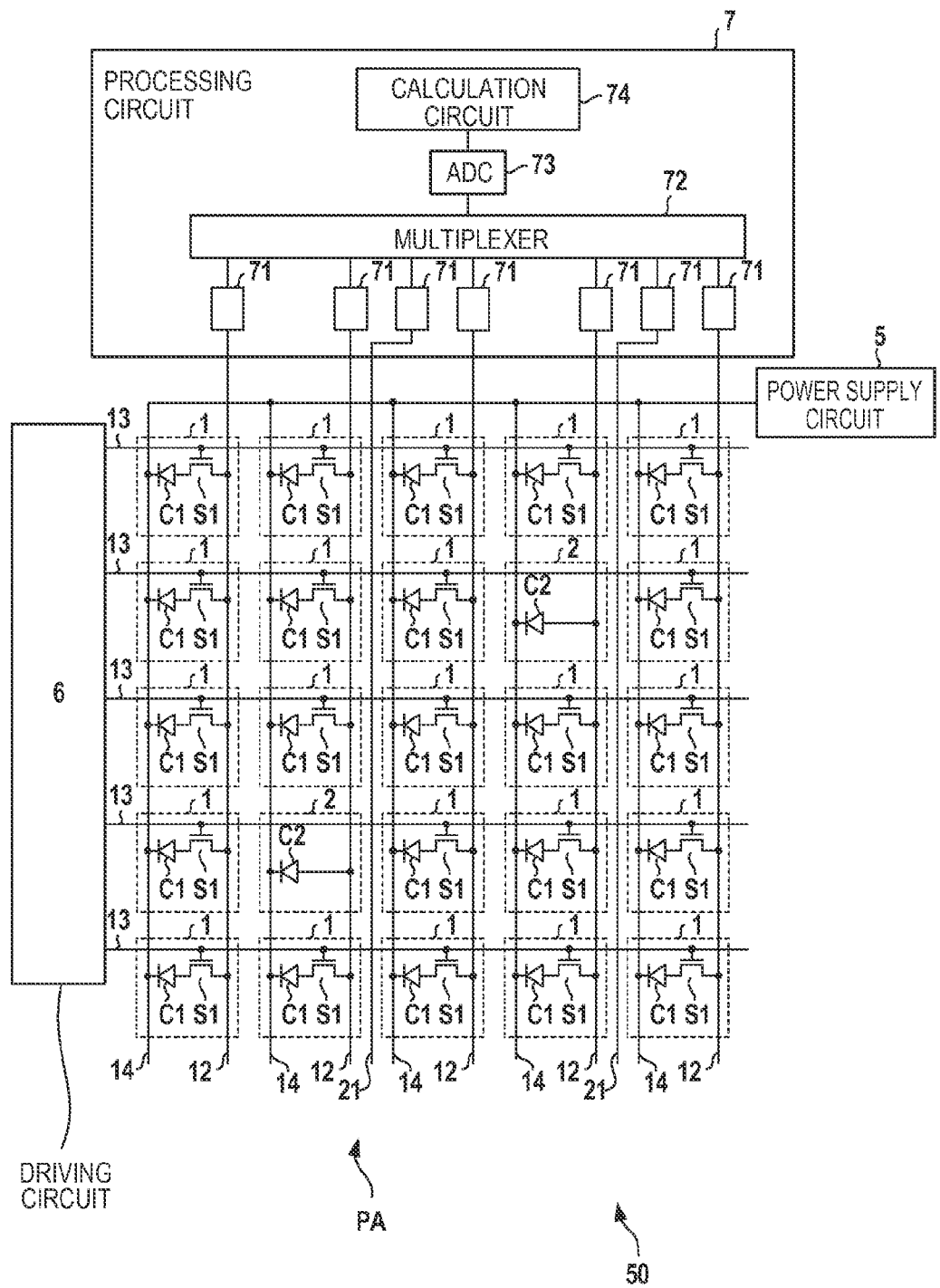
FIG. 14 is a circuit diagram showing the arrangement of a radiation imaging apparatus according to the ninth embodiment of the present invention.

FIG. 14 shows the arrangement of a radiation imaging apparatus 50 according to the ninth embodiment of the present invention. Details which are not mentioned in the ninth embodiment can comply with the first to eighth embodiments. According to the ninth embodiment, each sensor 2 includes no switch S2, and each sensor 2 is directly connected to a column signal line (first signal line) 12.

Figure 15:
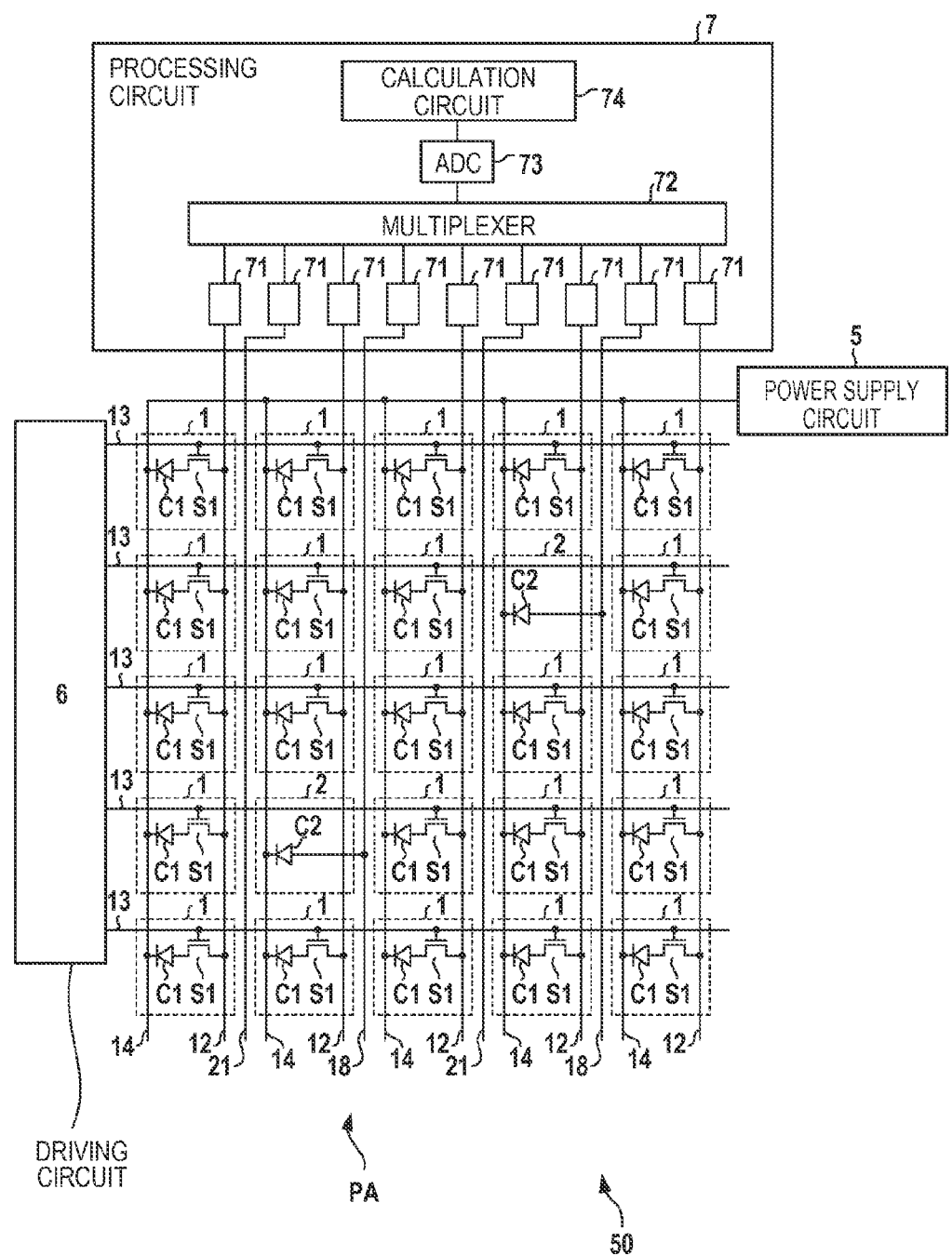
FIG. 15 is a circuit diagram showing the arrangement of a radiation imaging apparatus according to the 10th embodiment of the present invention.
Figure 16:
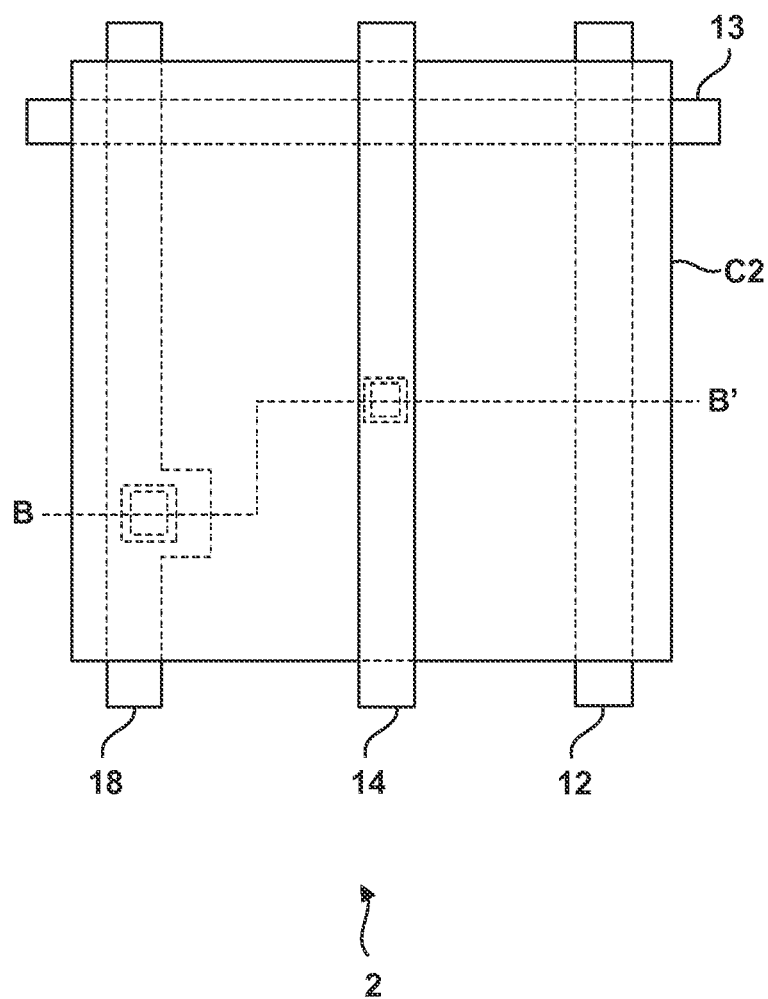
FIG. 16 is a plan view of a sensor of the radiation imaging apparatus according to the 10th embodiment of the present invention.
Figure 17:
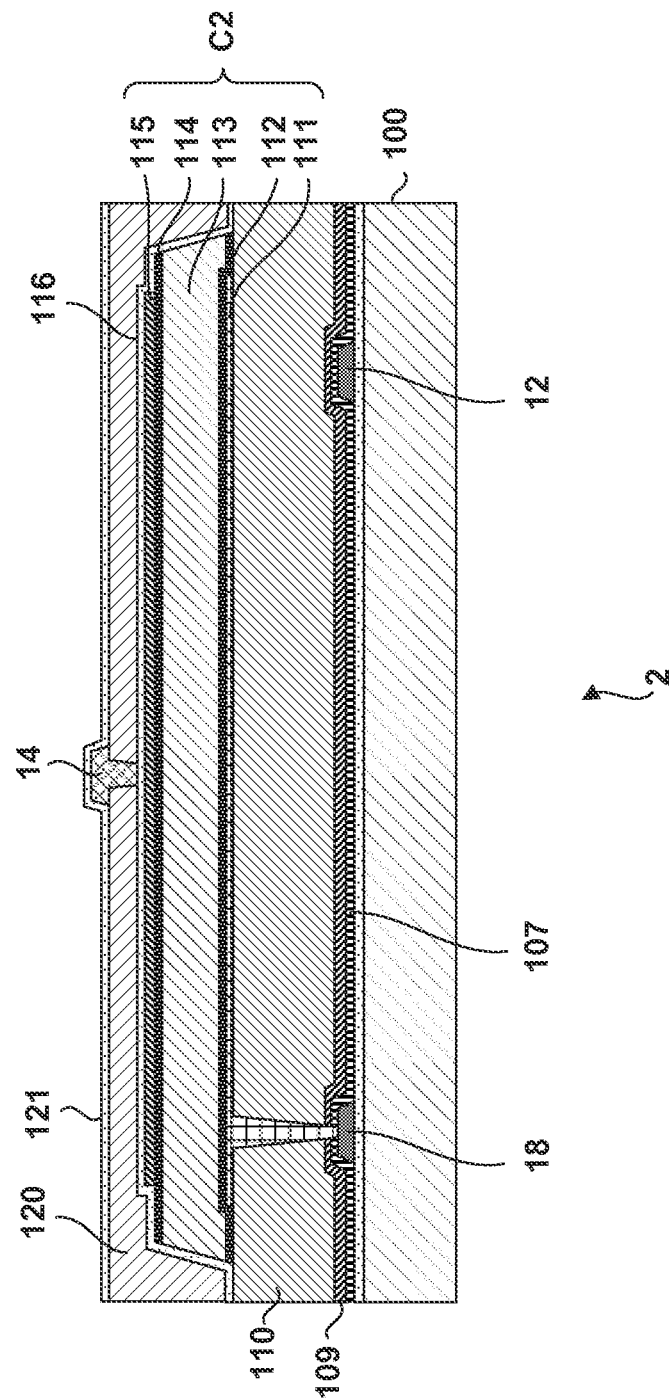
FIG. 17 is a view schematically showing the structure of a section taken along a line B-B' in FIG. 16.

FIG. 15 shows the arrangement of a radiation imaging apparatus 50 according to the 10th embodiment of the present invention. Details which are not mentioned in the 10th embodiment can comply with the first to eighth embodiments. According to the 10th embodiment, each sensor 2 includes no switch S2, and each sensor 2 is directly connected to a detection signal line (first signal line) 18. FIG. 16 is a plan view of each sensor 2 according to the 10th embodiment. FIG. 17 schematically shows the structure of a section taken along a line B-B' in FIG. 16. Each detection signal line (first signal line) 18 is connected to an output electrode 111 of a conversion element C2 of the sensor 2 via a through hole.

The ninth and 10th embodiments need not use any gate line 16 for each sensor 2. Note that in the ninth and 10th embodiment, a structure corresponding to the switch S2 may be arranged in each sensor 2 while not functioning. For example, the switch S2 is formed from a TFT, with its source and drain being short-circuited.

Figure 18:
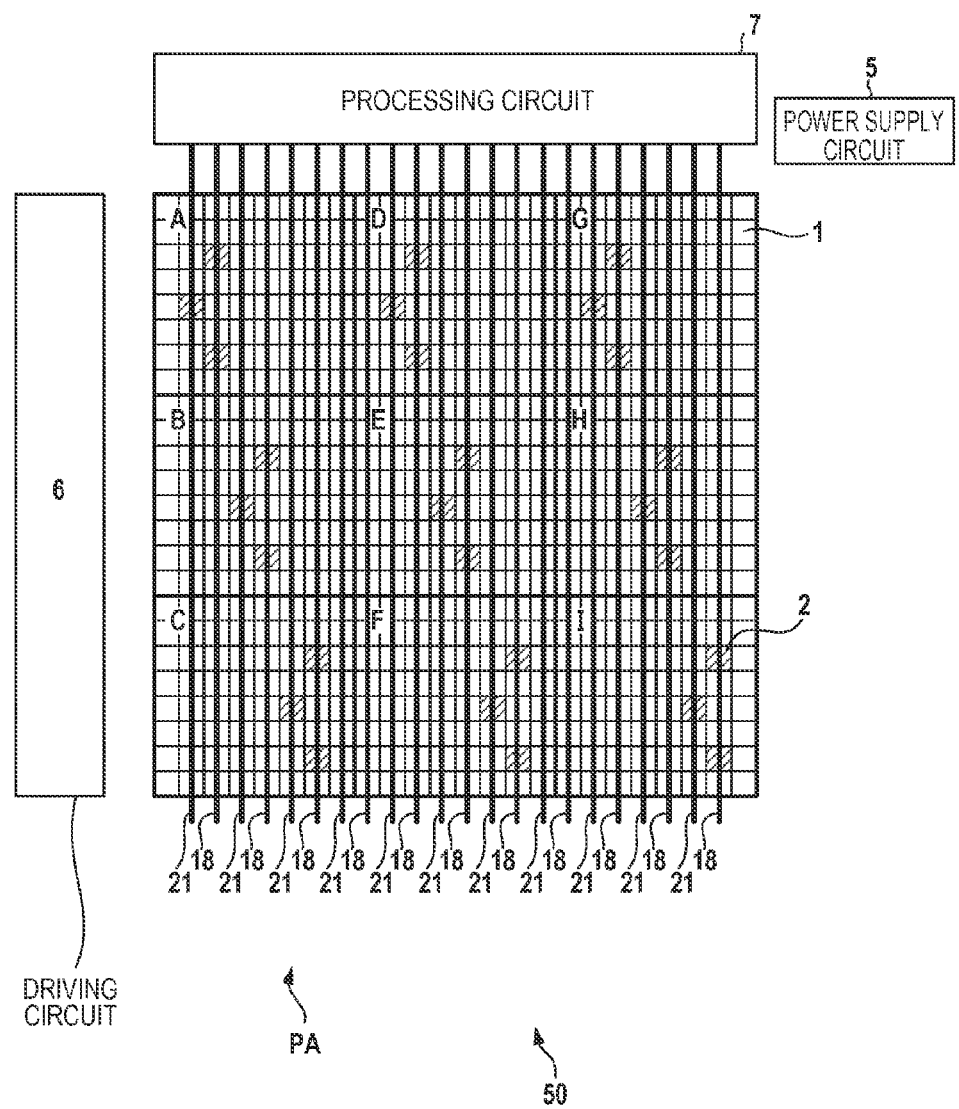
FIG. 18 is a circuit diagram showing the arrangement of a radiation imaging apparatus according to the 11th embodiment of the present invention.

FIG. 18 shows the arrangement of a radiation imaging apparatus 50 according to the 11th embodiment of the present invention. Details which are not mentioned in the 11th embodiment can comply with the first to 10th embodiments. For clarity, FIG. 18 omits gate lines 13 for driving pixels 1 and column signal lines 12 for transmitting signals from the pixels 1 to a processing circuit 7. According to the 11th embodiment, each sensor 2 includes no switch S2, and a conversion element C2 of each sensor 2 is directly connected to a detection signal line (first signal line) 18 or second signal line 21. Therefore, no gate lines 16 for controlling the switches S2 are provided.

In each of regions A to I, the number (first count) of sensors 2 connected to the detection signal line (first signal line) 18 differs from the number (second count) of sensors 2 connected to the second signal line 21. For example, the number (first count) of sensors 2 connected to the detection signal line (first signal line) 18 is larger than the number (second count) of sensors 2 connected to the column signal line 12. In addition, each sensor 2 connected to the detection signal line (first signal line) 18 differs from each sensor 2 connected to the second signal line 21.

Figure 19:
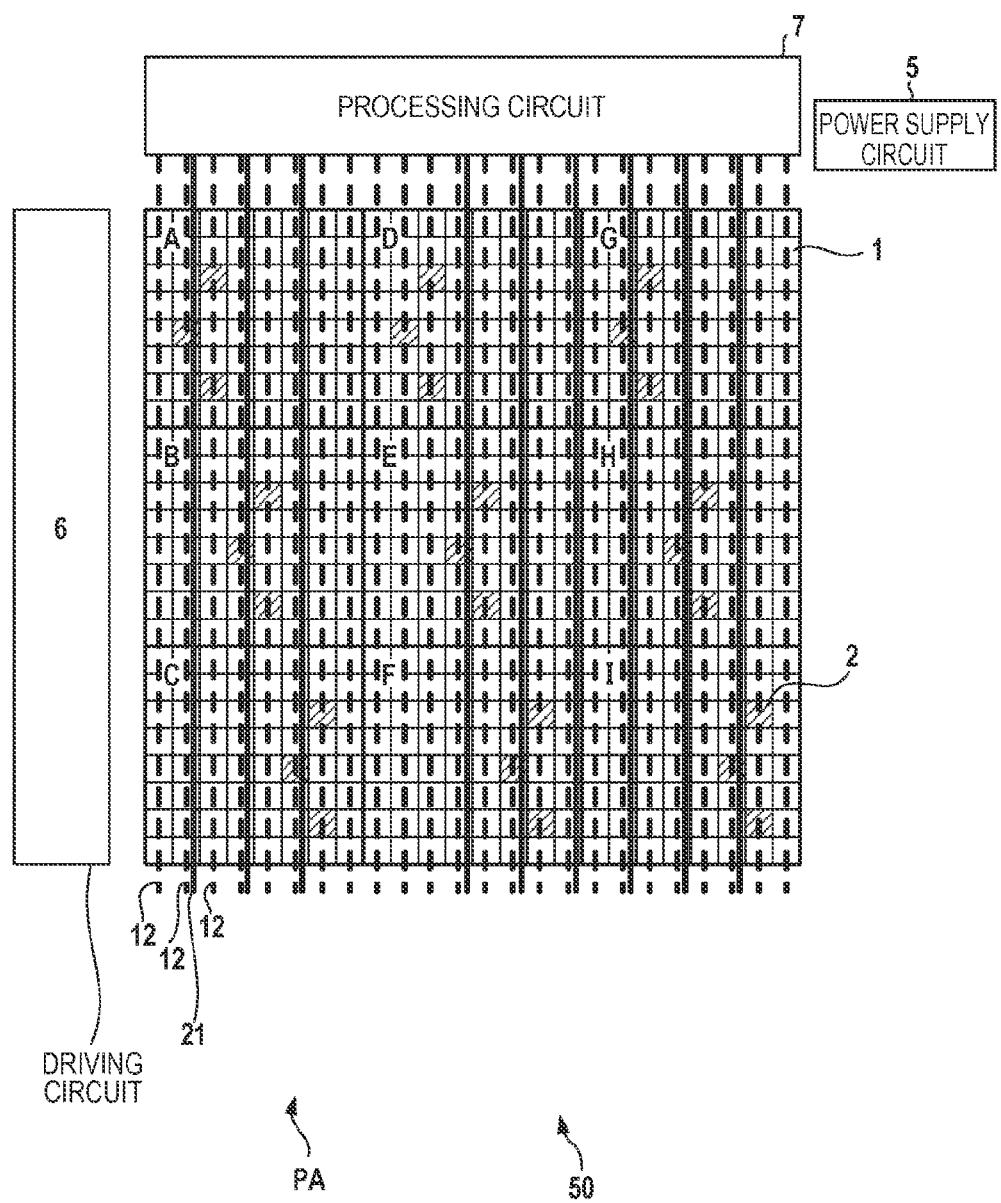
FIG. 19 is a circuit diagram showing the arrangement of a radiation imaging apparatus according to the 12th embodiment of the present invention.

FIG. 19 shows the arrangement of a radiation imaging apparatus 50 according to the 12th embodiment of the present invention. The 12th embodiment differs from the 11th embodiment in that signals from sensors 2 are connected to column signal lines (first signal lines) 12. Note that referring to FIG. 19, the column signal lines 12 are indicated by the dotted lines. In addition, for clarity, FIG. 19 omits gate lines 13 for driving pixels 1.

Figure 20:
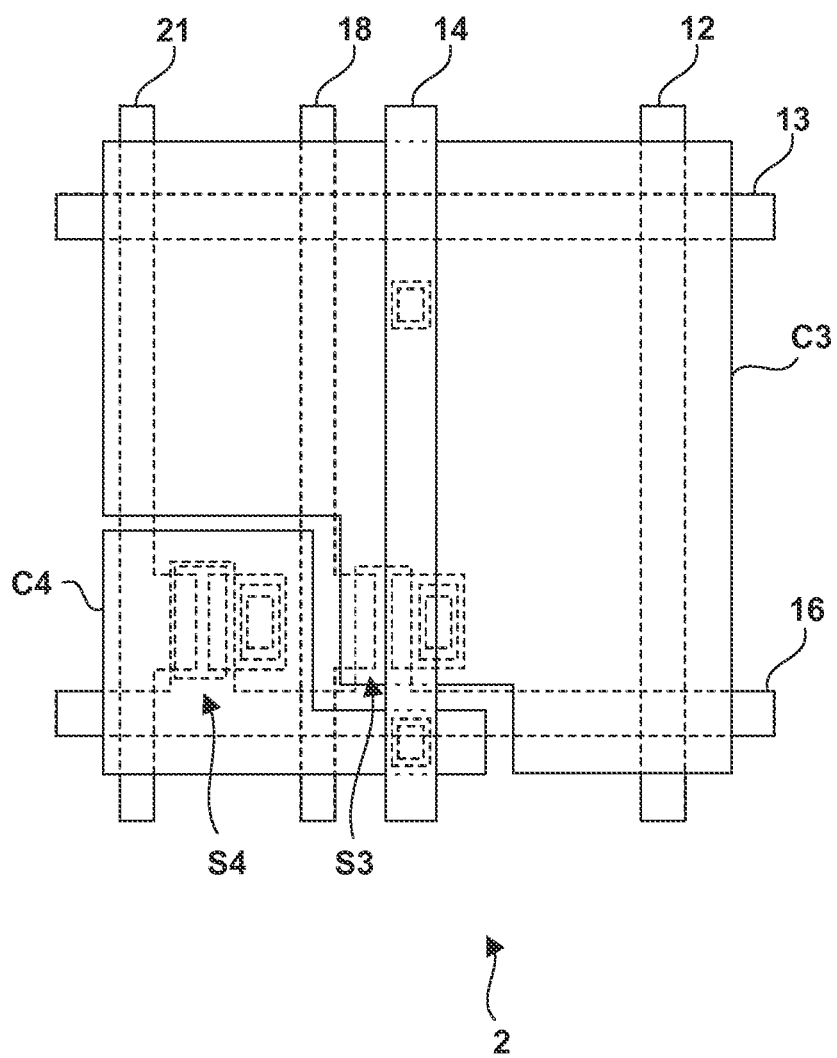
FIG. 20 is a plan view of a sensor of a radiation imaging apparatus according to the 13th embodiment of the present invention.

FIG. 20 shows a plan view of each sensor 2 of a radiation imaging apparatus 50 according to the 13th embodiment of the present invention. According to the 13th embodiment, each sensor 2 includes conversion elements C3 and C4 having different sizes and switches S3 and S4 which respectively connect the conversion elements C3 and C4 to a detection signal line (first signal line) 18 and a second signal line 21. In this case, the conversion element C3 having a larger size is connected to the detection signal line (first signal line) 18 via the switch S3, and the conversion element C4 having a smaller size is connected to the second signal line 21 via the switch S4. A processing circuit 7 calculates the difference between the value of a signal appearing on the detection signal line 18 and the value of a signal appearing on the second signal line 21. This difference originates from the difference in size between the conversion elements C3 and C4. According to the 13th embodiment as well, it is possible to obtain a signal with a crosstalk component being reduced or canceled as a signal representing the intensity or irradiation dose of radiation.

In all the embodiments described above, the arrangements shown in the accompanying drawings are merely typical examples, and the arrangement positions and connection relationships are not limited to those in these arrangements. For example, the vertical positional relationship between the common electrode 115 and the output electrode 111 of each conversion element may be reversed. Each conversion element may be a MIS photodiode instead of a PIN photodiode. In addition, each conversion element may be of a direct conversion type. The number of sensors 2 to be arranged in each region can be arbitrarily set. In addition, two or more sensors 2 may be coupled to each other.

In addition, since the detection signal lines (first signal lines) 18 and the second signal lines 21 cannot have completely the same pattern, they have different capacitances in a strict sense. For example, if the numbers of switches (TFTs) connected to these types of lines or the areas of switches which overlap them differ from each other, it is possible to further improve the accuracy by incorporating an algorithm which can obtain and correct parameters corresponding to the different amounts before shipment.

The numbers of sensors to be respectively connected to the first and second signal lines may be determined within ranges in which signals can be read out from the sensors with necessary accuracy. Dummy elements (for example, TFTs) may be connected to the first and second signal lines to reduce the difference in capacitance parasitic to them. Elements which do not perform photoelectric conversion, for example, capacitive elements, may be connected to the second signal lines via TFTs.

Figure 21A:
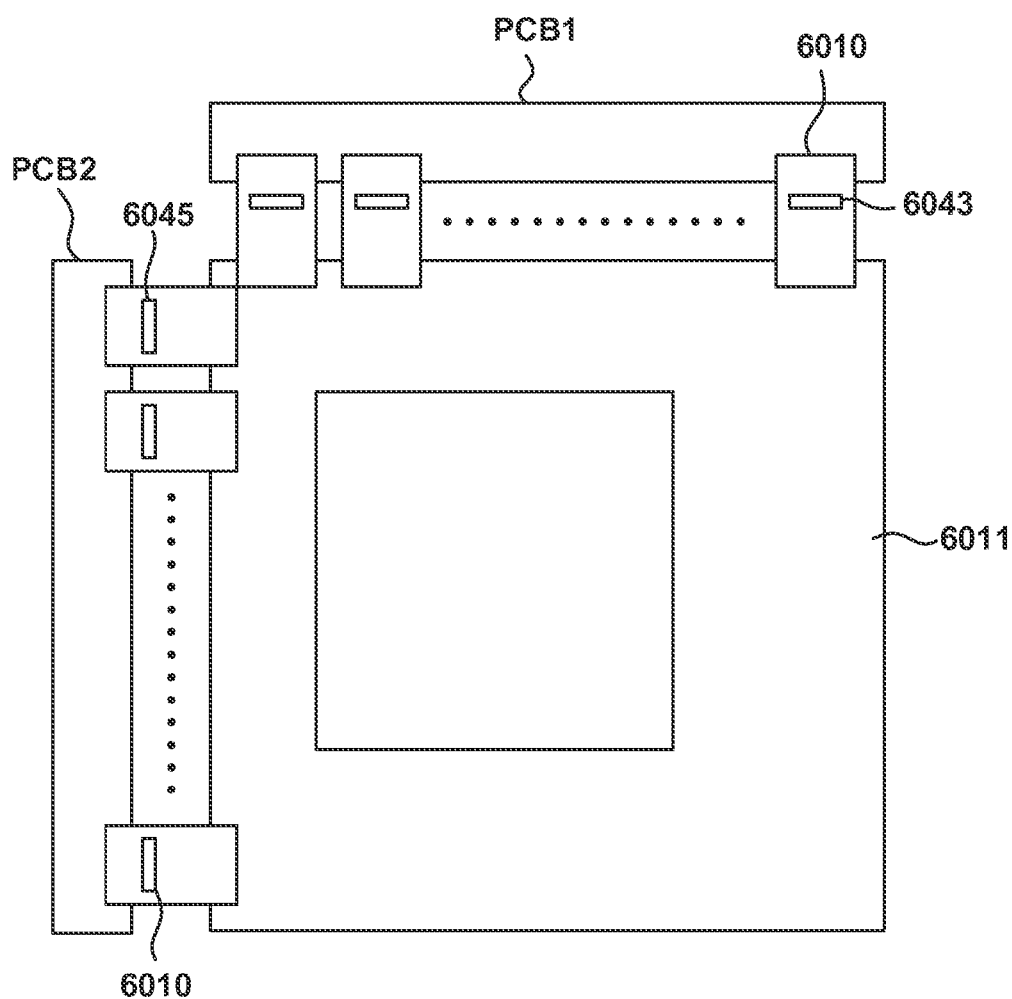
FIGS. 21A and 21B are views showing an example of the implementation of a radiation imaging apparatus.
Figure 21B:
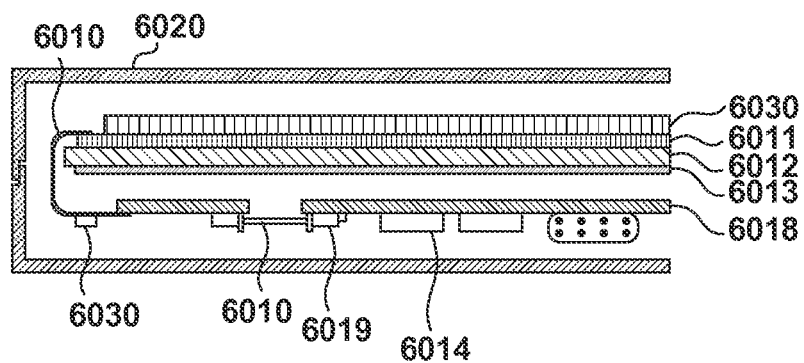

An example of the implementation of a radiation imaging apparatus will be described below with reference to FIGS. 21A and 21B. Pixels 1 and sensors 2 are arrayed on a sensor substrate 6011. Flexible circuit boards 6010 on which ICs 6043 forming shift registers and detection circuits are mounted are connected to the sensor substrate 6011. The opposite sides of the flexible circuit boards 6010 are connected to circuit boards PCB1 and PCB2. One or a plurality of sensor substrates 6011 can be bonded on a base 6012. A lead plate 6013 for protecting a memory 6014 in a processing circuit 6018 against X-rays is arranged under the base 6012. A scintillator 6030 (for example, a CsI layer) for converting X-rays (radiation) into visible light is deposited on the sensor substrate 6011. The above arrangement can be housed in a carbon fiber case 6020.

FIG. 22 shows an example applied to a radiation imaging system. The X-rays (radiation) 6060 generated by an X-ray tube (radiation source) 6050 are transmitted through a chest region 6062 of a patient or object 6061 and enter a radiation imaging apparatus 6040 on which a scintillator is mounted. The X-rays contain information about the interior of the body of the patient 6061. The scintillator emits light in accordance with the incidence of X-rays. The light is photoelectrically converted to obtain electric information. This information is converted into digital information. An image processor 6070 performs image processing for the information to allow the observation of the resultant image on a display 6080 in a control room.

In addition, this information can be transferred to a remote place via a transmission processing means such as a telephone line 6090. The information can be displayed on a display 6081 as a display means in another place such as a doctor room or can be stored in a recording means such as an optical disk. This makes it possible for a doctor in a remote place to perform diagnosis. In addition, a film processor 6100 as a recording means can record the information on a film 6110 as a recording medium.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-114369, filed Jun. 2, 2014, which is hereby incorporated by reference herein in its entirety.

What is claimed is:

1. A radiation imaging apparatus comprising:
   a plurality of pixels arranged to form an array having a plurality of rows and a plurality of columns and configured to convert radiation into an electric signal to obtain a radiation image;
   a plurality of sensors including conversion elements configured to convert radiation into electric signals and dispersed in the array to monitor radiation;
   a processing circuit configured to process signals output from the plurality of sensors;
   a plurality of first signal lines configured to transmit a signal output from at least one of the plurality of sensors to the processing circuit; and
   a plurality of second signal lines extending in a direction parallel to the plurality of first signal lines in the array and not directly connected to the plurality of pixels and the conversion elements or connected to at least one of the plurality of pixels and at least one of the plurality of sensors,
   wherein the processing circuit determines a value of a signal generated by each sensor based on a difference between a value of a signal appearing on a first signal line, of the plurality of first signal lines, which is for the sensor and a value of a signal appearing on at least one of the plurality of second signal lines.

2. The apparatus according to claim 1, wherein the sensor includes a switch provided between the conversion element and one of the first signal line and the second signal line.

3. The apparatus according to claim 1, wherein the conversion element is directly connected to the first signal line.

4. The apparatus according to claim 1, wherein the plurality of pixels is arranged such that each of the plurality of rows is formed by the same number of pixels.

5. The apparatus according to claim 1, wherein the processing circuit further processes signals output from the plurality of pixels, and includes a plurality of detection circuits configured to detect signals respectively appearing on the plurality of first signal lines and the plurality of second signal lines.

6. The apparatus according to claim 5, further comprising a plurality of column signal lines extending in the array in a direction parallel to the plurality of first signal lines,
wherein a signal generated by each conversion element is transmitted to the processing circuit via a corresponding column signal line of the plurality of column signal lines.

7. The apparatus according to claim 5, wherein the plurality of first signal lines are used to transmit signals from the plurality of pixels to the processing circuit as well as transmitting signals generated by the plurality of sensors to the processing circuit.

8. The apparatus according to claim 1, wherein the plurality of second signal lines comprises a line configured to transmit a signal output from at least one sensor of the plurality of sensors to the processing circuit,
signals from a first count of first sensors of the plurality of sensors are output to the first signal lines, signals from a second count of second sensors of the plurality of sensors are output to the second signal lines, the first count differs from the second count, and the first sensor differs from the second sensor, and
the processing circuit monitors radiation based on a difference between a value of a signal appearing on the first signal line and a value of a signal appearing on the second signal line.

9. The apparatus according to claim 8, wherein the plurality of sensors includes a first sensor and a second sensor which have different sizes,
a signal from the first sensor is output to the first signal line, and a signal from the second sensor is output to the second signal line, and
the processing circuit monitors radiation based on a difference between a value of a signal appearing on the first signal line and a value of a signal appearing on the second signal line.

10. The apparatus according to claim 1, wherein the processing circuit controls a radiation source configured to emit radiation, based on integration of the difference.

11. The apparatus according to claim 1, wherein the processing circuit detects start and/or end of radiation irradiation based on a sum of values of signals appearing on the plurality of first signal lines and values of signals appearing on the plurality of second signal lines.

12. The apparatus according to claim 1, wherein the first signal line for the sensor and the at least one second signal line are capacitively coupled to each other between pixels on a corresponding column of the plurality of columns.

13. The apparatus according to claim 12, wherein each of the plurality of pixels includes a conversion element configured to convert radiation into an electric signal, and
the first signal line for the sensor and the at least one second signal line are arranged to overlap conversion elements of pixels on the corresponding column.

14. A radiation imaging system comprising:
a radiation source configured to generate radiation; and
a radiation imaging apparatus defined in claim 1.

* * * * *